United States Patent
Zhang et al.

(10) Patent No.: US 11,487,935 B2
(45) Date of Patent: Nov. 1, 2022

(54) METHOD AND APPARATUS FOR AUTOMATICALLY SPLITTING TABLE CONTENT INTO COLUMNS, COMPUTER DEVICE, AND STORAGE MEDIUM

(71) Applicant: Tencent Technology (Shenzhen) Company Limited, Shenzhen (CN)

(72) Inventors: Ning Zhang, Shenzhen (CN); Fang Qian, Shenzhen (CN); Jiangwei Liu, Shenzhen (CN); Wei Xiong, Shenzhen (CN); Defeng Liu, Shenzhen (CN); Haitong Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 51 days.

(21) Appl. No.: 17/192,708

(22) Filed: Mar. 4, 2021

(65) Prior Publication Data
US 2021/0264102 A1 Aug. 26, 2021

Related U.S. Application Data

(63) Continuation of application No. PCT/CN2019/115994, filed on Nov. 6, 2019.

(30) Foreign Application Priority Data

Nov. 28, 2018 (CN) .......................... 201811437473.2

(51) Int. Cl.
*G06F 40/18* (2020.01)
*G06F 16/38* (2019.01)
(Continued)

(52) U.S. Cl.
CPC ............ *G06F 40/18* (2020.01); *G06F 16/328* (2019.01); *G06F 16/3334* (2019.01);
(Continued)

(58) Field of Classification Search
CPC .... G06F 40/18; G06F 16/328; G06F 16/3334; G06F 16/3335; G06F 16/38; G06F 16/90344; G06F 40/177
See application file for complete search history.

(56) References Cited

U.S. PATENT DOCUMENTS 7,155,665 B1 * 12/2006 Browne .................. G06F 40/18
715/273
11,194,793 B1 * 12/2021 Srivastava .............. G06F 16/93
(Continued)

FOREIGN PATENT DOCUMENTS

CN 104090850 A 10/2014
CN 107133208 A 9/2017
(Continued)

OTHER PUBLICATIONS

Tencent Technology, WO, PCT/CN2019/115994, Feb. 1, 2020, 5 pgs.
(Continued)

*Primary Examiner* — Quoc A Tran
(74) *Attorney, Agent, or Firm* — Morgan, Lewis & Bockius LLP

(57) ABSTRACT

A method for automatically splitting row-based table content into columns is provided, including: receiving first table content sent by a client, the first table content including one or more rows of text data to be split into columns; performing information extraction on the one or more rows of text data in the first table content to obtain an information tag in the one or more rows of text data; performing column splitting on the one or more rows of text data according to the information tag to obtain second table content, the second table content comprising one or more columns of text data after the column splitting; and transmitting the second table content to the client.

18 Claims, 25 Drawing Sheets

(51) Int. Cl.
  *G06F 16/33* (2019.01)
  *G06F 16/903* (2019.01)
  *G06F 16/31* (2019.01)
  *G06F 40/177* (2020.01)
  *G06F 17/00* (2019.01)

(52) U.S. Cl.
  CPC .......... *G06F 16/3335* (2019.01); *G06F 16/38* (2019.01); *G06F 16/90344* (2019.01); *G06F 40/177* (2020.01)

(56) References Cited

U.S. PATENT DOCUMENTS

| | | |
|---|---|---|
| 2008/0222507 A1 | 9/2008 | Nguyen et al. |
| 2009/0234818 A1* | 9/2009 | Lobo ..................... G06F 16/93 |
| 2010/0057704 A1 | 3/2010 | Duffie et al. |

FOREIGN PATENT DOCUMENTS

| | | |
|---|---|---|
| CN | 107704444 A | 2/2018 |
| CN | 107818075 A | 3/2018 |
| CN | 109522538 A | 3/2019 |

OTHER PUBLICATIONS

Tencent Technology, IPRP, PCT/CN2019/115994, May 25, 2021, 6 pgs.
Tencent Technology, ISR, PCT/CN2019/115994, Feb. 1, 2020, 2 pgs.

* cited by examiner

| | A | B | C | D |
|---|---|---|---|---|
| | Name Sex DOB Phone Number of Attendees | | | |
| 1, | Duan Xi M 2012.5.30 | | | |
| | 13800138000 3 | | | |
| 2, | Wei Jia F 2012.6.15 13800138000 4 | | | |
| 3, | Xie Yan Bing F 2011.9.11 13800138000 3 | | | |
| | . . . | | | |

Guide for column splitting on text - Step 2, a total of 3 steps

You can set separators included in your data in this screen.

Separator
- [X] Tab
- [ ] Semicolon
- [ ] Colon
- [X] Space
- [ ] Others:[ ]

[X] Process consecutive separators as one

Text qualifier: "

Preview of selected data:

| Name | Sex | DOB | Phone | Number of Attendees |
|---|---|---|---|---|
| 1, Duan Xi | M | 2012.5.30 | 13800138000 | 3 |
| 2, Wei Jia | F | 2012.6.15 | 13800138000 | 4 |
| 3, Xie Yan Bing | F | 2011.9.11 | 13800138000 | 3 |

Cancel  < Previous  Done

FIG. 1

| A | B | C | D |
|---|---|---|---|
| Name Sex DOB Phone Number of Attendees ||||
| 1, Duan Xi M 2012.5.30 ||||
| 13800138000 3 ||||
| 2, Wei Jia F 2012.6.15 13800138000 4 ||||
| 3, Xie Yan Bing F 2011.9.11 13800138000 3 ||||
| . . . ||||

Guide for column splitting on text – Step 2, a total of 3 steps

Please set a field width (column spacing).

To build a column-splitting line, please click a mouse at a column-splitting position.

To clear a column-splitting line, please double-click the column-splitting line.

To shift a position of a column-splitting line, please hold the column-splitting line and drag the column-splitting line to a specified position.

Preview of selected data:

| Name | Sex | DOB | Phone | Number of Attendees |
|---|---|---|---|---|
| 1, Duan Xi | M | 2012.5.30 | 13800138000 | 3 |
| 2, Wei Jia | F | 2012.6.15 | 13800138000 | 4 |
| 3, Xie Yan Bing | F | 2011.9.11 | 13800138000 | 3 |

< Previous     Cancel     Done

FIG. 2

Follow: 1, Liu Zi Rui has one more English class and ......

1. Liu Zi Rui has one more English class and ...
2. Liu Xia Han has one more test ...
3. Pan Jia Yang has one less English test ...
4. .
5. .
 . .
 .
 .

FIG. 8

METHOD AND APPARATUS FOR AUTOMATICALLY SPLITTING TABLE CONTENT INTO COLUMNS, COMPUTER DEVICE, AND STORAGE MEDIUM

CROSS REFERENCE TO RELATED APPLICATIONS

This application is a continuation application of PCT Patent Application No. PCT/CN2019/115994, entitled "METHOD AND DEVICE FOR AUTOMATICALLY SPLITTING TABLE CONTENT INTO COLUMNS, COMPUTER APPARATUS, AND STORAGE MEDIUM" filed on Nov. 6, 2019, which claims priority to Chinese Patent Application No. 201811437473.2, filed with the State Intellectual Property Office of the People's Republic of China on Nov. 28, 2018, and entitled "METHOD AND APPARATUS FOR AUTOMATICALLY SPLITTING TABLE CONTENT INTO COLUMNS, DEVICE, AND STORAGE MEDIUM", all of which are incorporated herein by reference in their entirety.

FIELD OF THE TECHNOLOGY

Embodiments of this application relate to the field of office software, and in particular, to a method, apparatus, computer device, and storage medium for automatically splitting table content into columns.

BACKGROUND OF THE DISCLOSURE

Table processing software is one of the most widely used software in office software. Table processing software provides a column-splitting function.

The column-splitting function is a function of splitting a selected single column of text data in a table into columns according to a specified rule. An exemplary application scenario of the column-splitting function is that: A plurality of users each provide a row of data in the same chat group, and one user aggregates a plurality of rows of data into the same column in a table, and then splits the column of data into a plurality of columns of data by using a column-splitting function. For example, the first cell of the first column is filled with "张三 男 21 岁 (Zhang San, Male, 21 years old)", the second cell of the first column is filled with "李四 女 22 岁 (Li Si, Female, 22 years old)", and the third cell of the first column is filled with "王五 男 30 岁 (Wang Wu, Male, 30 years old)". When the user sets to use a space as a column-splitting rule, the table processing software splits the foregoing column of data into three columns according to the spaces, as shown in Table 1 below:

TABLE 1

| 张三 (Zhang San) | 男 (Male) | 21 岁 (21 years old) |
| 李四 (Li Si) | 女 (Female) | 22 岁 (22 years old) |
| 王五 (Wang Wu) | 男 (Male) | 30 岁 (30 years old) |

In the foregoing column-splitting function, each row of data is required to use the same column-splitting rule. However, when a plurality of users provide data in a chat group, it is likely that some users use different column-splitting symbols. Consequently, after aggregation, the user still needs to manually perform adjustment a large number of times, to obtain a relatively accurate column-splitting result.

SUMMARY

Various embodiments of this application provide a method, apparatus, computer device, and a storage medium for automatically splitting table content into columns. The technical solutions are as follows:

According to an aspect of this application, a method for automatically splitting table content into columns, performed by a server, is provided, the method including:

receiving first table content sent by a client, the first table content comprising one or more rows of text data to be split into columns;

performing information extraction on the one or more rows of text data in the first table content to obtain an information tag in the one or more rows of text data;

performing column splitting on the one or more rows of text data according to the information tag to obtain second table content, the second table content comprising one or more columns of text data after the column splitting; and transmitting the second table content to the client.

According to another aspect of this application, a method for automatically splitting table content into columns, executed by a terminal, is provided, the method including:

displaying an online table interface;

determining first table content in the online table interface according to an operation signal, and transmitting the first table content to a server;

receiving second table content transmitted by the server, the second table content being obtained by performing, by the server, information extraction on one or more rows of text data in the first table content, and performing column splitting on the one or more rows of text data in the first table content according to an extracted information tag; and displaying the second table content in the online table interface, the second table content including a row of text data after the column splitting.

According to another aspect of this application, an apparatus for automatically splitting table content into columns is provided, the apparatus including:

a receiving module, configured to receive first table content sent by a client, the first table content comprising one or more rows of text data to be split into columns;

an extraction module, configured to perform information extraction on the one or more rows of text data in the first table content to obtain an information tag in the one or more rows of text data;

a column-splitting module, configured to perform column splitting on the one or more rows of text data according to the information tag to obtain second table content, the second table content comprising one or more columns of text data after the column splitting; and a transmitting module, configured to transmit the second table content to the client.

According to another aspect of this application, an apparatus for automatically splitting table content into columns is provided, the apparatus including:

a display module, configured to display an online table interface;

a determining module, configured to determine first table content in the online table interface according to an operation signal, and transmit the first table content to a server; and a receiving module, configured to receive second table content transmitted by the server, the second table content being obtained by performing, by the server, information extraction on a row of text data in the first table content, and performing column splitting on the row of text data in the first table content according to an extracted information tag, the display module being configured to display the second table content in the online table interface, the second table content including a row of text data after the column splitting.

According to another aspect of this application, a computer device is provided, in response of being specifically implemented as a server, the computer device including a processor and a memory, the memory storing computer-readable instructions, the computer-readable instructions, when executed by the processor, causing the processor to perform the operations in the method for automatically splitting table content into columns.

According to another aspect of this application, a computer device is provided, in response of being specifically implemented as a terminal, the computer device including a processor and a memory, the memory storing computer-readable instructions, the computer-readable instructions, when executed by the processor, causing the processor to perform the operations in the method for automatically splitting table content into columns.

According to another aspect, a non-transitory computer-readable storage medium, storing computer-readable instructions, the computer-readable instructions, when executed by one or more processors, causing the one or more processors to perform operations in the method for automatically splitting table content into columns.

According to another aspect, a computer program product is provided, the computer program product, when run on a computer, causing the computer to perform the method for automatically splitting table content into columns as stated above.

Details of one or more embodiments of this application are provided in the following accompanying drawings and descriptions. Other features, objectives, and advantages of this application become apparent from the specification, the accompanying drawings, and the claims.

BRIEF DESCRIPTION OF THE DRAWINGS

To describe the technical solutions of the embodiments of this application more clearly, the following briefly describes the accompanying drawings required for describing the embodiments. Apparently, the accompanying drawings in the following description show only some embodiments of this application, and a person of ordinary skill in the art may still derive other accompanying drawings according to the accompanying drawings without creative efforts.

FIG. 1 is a schematic implementation diagram of a column-splitting function in the related art.

FIG. 2 is a schematic implementation diagram of a column-splitting function in the related art.

FIG. 7 is a schematic implementation diagram of a method for automatically splitting table content into columns according to another exemplary embodiment of this application.

FIG. 8 is a schematic implementation diagram of a method for automatically splitting table content into columns according to another exemplary embodiment of this application.

DESCRIPTION OF EMBODIMENTS

To make the objectives, technical solutions, and advantages of this application clearer, implementations of this application are further described below in detail with reference to the accompanying drawings.

When a piece of irregular text data is pasted or imported into an Excel table, manually sorting and filling in effective information, such as "name" and "phone number", in a corresponding single cell takes a user a lot of time. A column-splitting function is provided in a conventional table processing program. The column-splitting function is a function of splitting a selected single column of text data in a table into columns according to a specified rule. In the related art, text content is split into columns by setting a separator, a space, a comma, or a dividing line between different information types. A space and a dividing line are used as examples below.

1) A space is used as a column-splitting condition.

Since a large number of different separators may exist in original text data, data cannot be split according to an ideal condition by implementing column-splitting using a single rule. Some pieces of text are to be split into a column B, but because a used condition is a space, and the space is not used as a separator in some pieces of text, content still remains in a column A. As shown in FIG. 1, a user sets "tab" and "space" as separators. A comma is used as a separator in "谢燕冰, 女, 2011.09.11, 13800138000 2 位" in the third row, resulting in that column splitting cannot be normally performed on this row of text data. "谢燕冰, 女, 2011.09.11, 13800138000" is completely split into the first column.

2) A dividing line is used as a column-splitting condition.

A user may alternatively set a dividing line as a column-splitting condition, and then, manually add a dividing line in a table to perform column splitting. As shown in FIG. 2, a user adds a splitting line at a corresponding position in each row of text data, and then, the table processing program splits the row of text data into columns. However, because dividing lines are manually added a large number of times, compared with that a user directly performs manual column splitting, column splitting efficiency is not improved.

This embodiment provides a solution for automatically splitting table content into columns. In this technical solution, after text data in a table is learned and recognized by using the artificial intelligence (AI) technology. One-key extraction of entity information from row of text data is implemented by using an entity extraction technology. Correspondingly, all different types of entity information are classified and sorted into corresponding columns. For example, entity information with an information tag of "name" in each row of data is classified into a name column, and entity information with an information tag of "gender" in each row of data is classified into a gender column.

Figure 3:
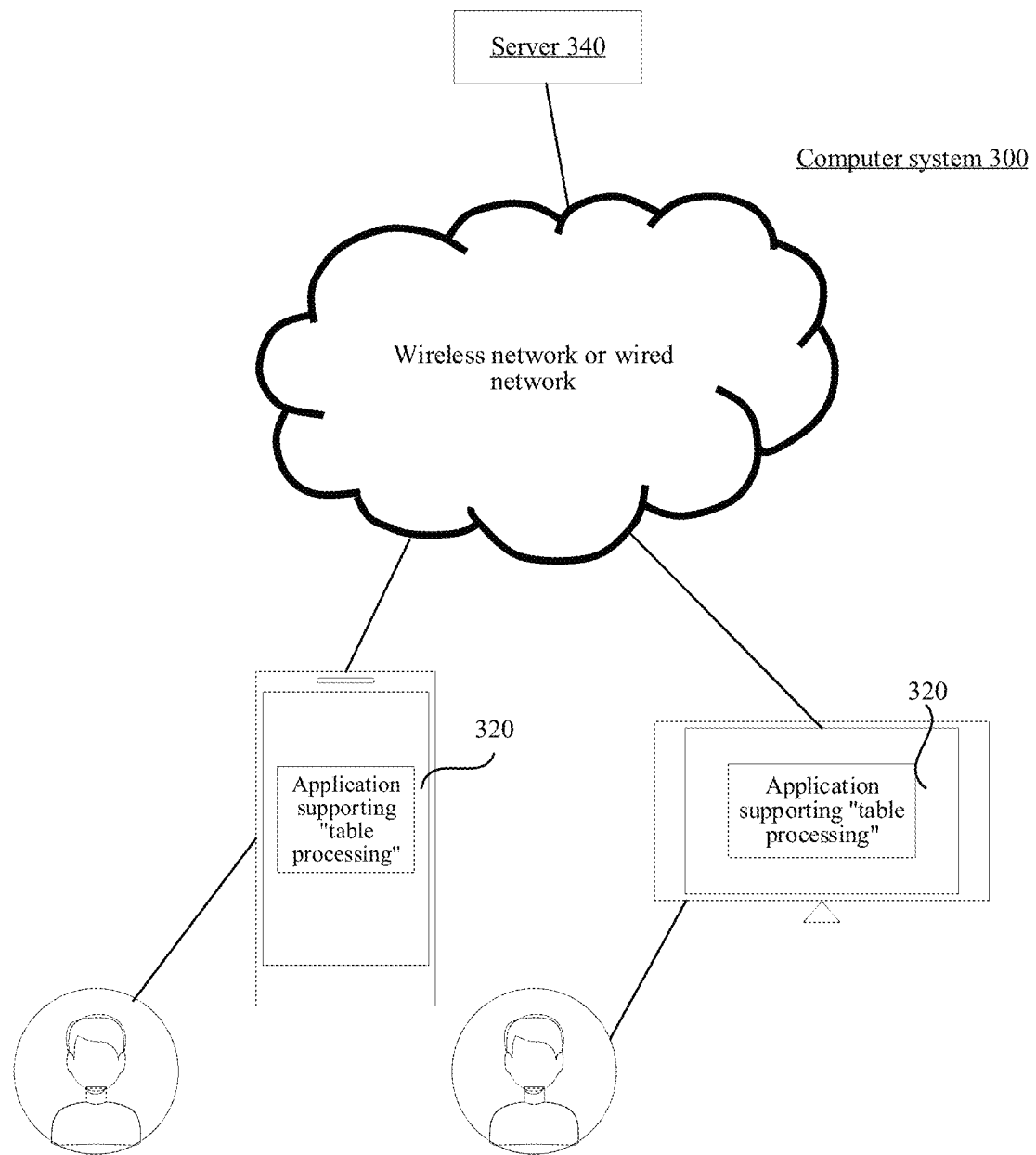
FIG. 3 is a structural block diagram of a computer system according to an exemplary embodiment of this application.

FIG. 3 is a block diagram of a computer system 300 according to an exemplary embodiment of this application. The computer system 300 may be any one of an instant messaging system, an online office system, and a teamwork system. This is not limited in the embodiments of this application. The computer system 300 includes a terminal 320 and a server 340.

The terminal 320 may be a mobile phone, a tablet computer, an ebook reader, a shifting picture experts group audio layer III (MP3) player, a moving picture experts group audio layer IV (MP4) player, a laptop portable computer, a desktop computer, or the like. A client supporting an online table processing function is installed in the terminal 320. The client is at least one of a client configured to perform table processing in a form of a program, a client configured to perform table processing in a form of a web page, and an applet configured to perform table processing in a form of a web page. An applet is a program that relies on a parent application to be run, and a plurality of different applets may be run on the same parent application.

The terminal 320 is connected to the server 340 by using a wireless network or a wired network.

The server 340 may include at least one of one server, a plurality of servers, a cloud computing platform, and a virtualization center. The server 340 is configured to provide a back-end service for an application supporting a voice message. In an embodiment, the server 340 takes on primary computing work, and the terminal 320 takes on secondary computing work; alternatively, the server 340 takes on secondary computing work, and the terminal 320 takes on primary computing work; alternatively, collaborative computing is performed by using a distributed computing architecture between the terminal 320 and the server 340. A computer program is run on the server 340, and the computer program is configured to implement a column-splitting function in the following method embodiments.

Figure 4:
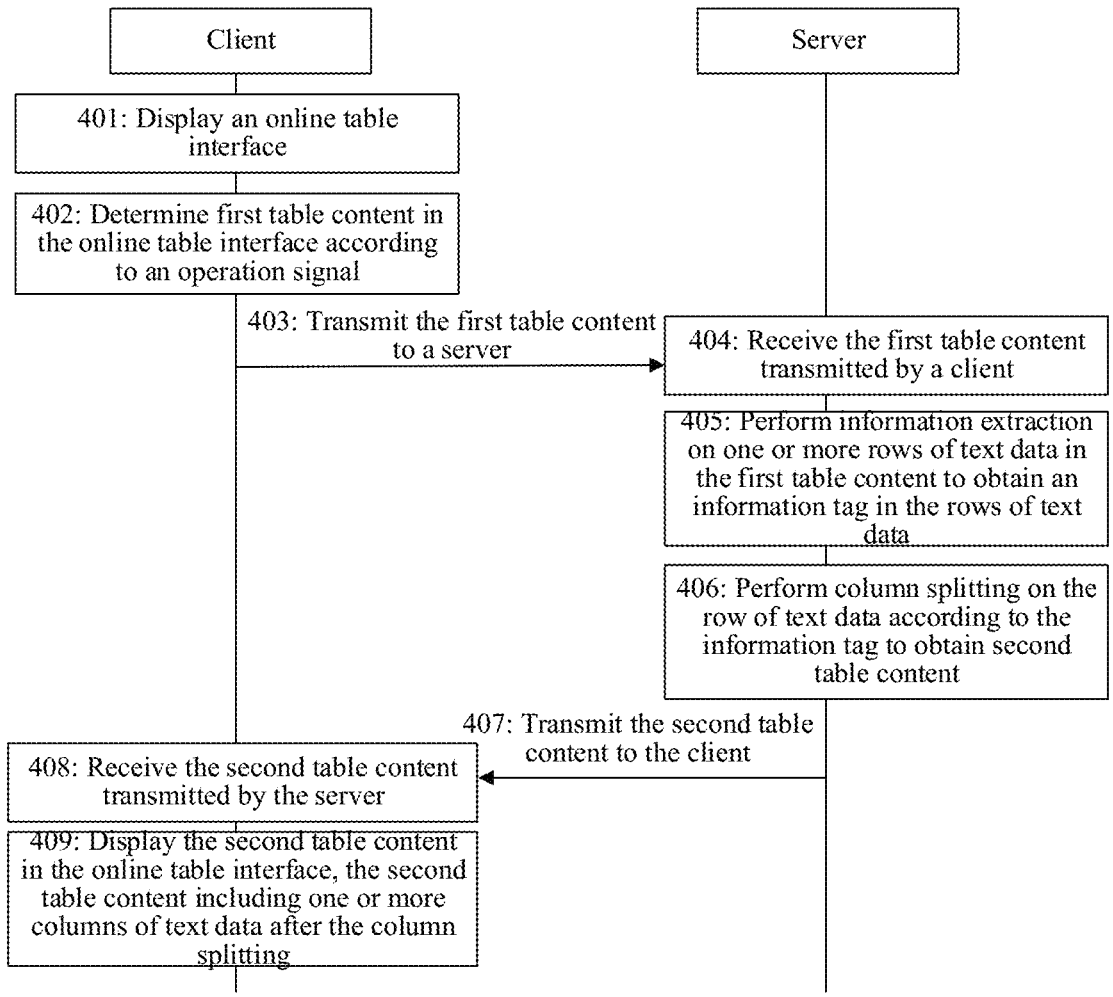
FIG. 4 is a flowchart of a method for automatically splitting table content into columns according to an exemplary embodiment of this application.

FIG. 4 is a flowchart of a method for automatically splitting table content into columns according to an exemplary embodiment of this application. In this embodiment, description is made by using an example in which the method is applied to the computer system shown in FIG. 3. A client supporting online table processing is run on a terminal of the computer system. The method includes the following steps:

Step 401: The client displays an online table interface.

The client supports online table processing. In an embodiment, the client is a local program installed and run on an operating system, or the client is a web page program (front-end program for short) that provides a service in a form of a web page. A specific form of the client is not limited in this embodiment.

An online table interface is displayed on the client. The online table interface is a user interface for editing an online table. The online table interface is of a program interface type or a web page interface type.

The online table interface displays a plurality of cells distributed in rows and columns, a row number of each cell, a column number of each cell, and a plurality of controls related to table editing.

The online table may be an online document supporting multi-person cooperation. The client does not need to be downloaded and installed, and it only needs to open a website to edit a document, create a new document, or import a local document. Different users may log in to an online table interface by using respective accounts, for example, instant messaging accounts, to implement multi-person online collaborative editing.

Step 402: The client determines first table content in the online table interface according to an operation signal.

The first table content includes a row of text data to be split into columns. There is one or more rows of text data to be split into columns. In an embodiment, the first table content is a plurality of rows of text data belonging to the same column, and the same row of text data includes at least two pieces of entity information to be split into columns.

The client may determine the first table content in the online table interface in either of the following two operation modes.

1. Copy and Paste Mode:

A user pastes the row of text data to be split columns into a cell in the online table interface, and the client stores at least one row of text data into the online table interface according to the copy and paste operations of the user. In addition, in response to determining that there are at least two pieces of entity information to be split into columns in the row of text data, the client determines the pasted table content as the first table content.

2. Area Selection Mode:

When table content has been stored in the online table interface, a user may select a target cell in the online table interface by using a mouse, a keyboard, or a touchscreen. The client determines table content in the target cell as the first table content according to the cell selection operation of the user.

Step 403: The client transmits the first table content to a server.

When the client recognizes that there are one or more rows of text data to be split into columns in the first table content, the client transmits the first table content to the server.

In an embodiment, a column-splitting function control is displayed on the online table interface, and when the column-splitting function control receives a trigger signal, the client transmits the first table content to the server. For example, when the client recognizes that there is a row of text data to be split into columns in the first table content, a prompt message box, "You may want to automatically sort data, confirm or cancel", pops up, and in response to receiving a click signal from the user on a "Confirm" button, the client transmits the first table content to the server.

In an embodiment, the client transmits an account and the first table content to the server.

Step 404: The server receives the first table content transmitted by the client.

Step 405: The server performs information extraction on the one or more rows of text data in the first table content to obtain an information tag in the rows of text data.

The same rows of text data to be split into one or more columns includes at least two pieces of entity information, and the server performs information extraction on the rows of text data in the first table content to obtain an information tag in the rows of text data.

The information tag is information used for recognizing an information category of the entity information. Exemplarily, the information tag includes: at least one of name, gender, age, time, mobile phone number, bank card number, postal code, number string, and address, which is not limited in this embodiment.

In an embodiment, the server performs information extraction on the rows of text data in the first table content by using the AI technology to obtain an information tag of each piece of entity information in the rows of text data.

Step 406: The server performs column splitting on the rows of text data according to the information tag to obtain second table content.

When there is one row of text data to be split into columns, the server splits entity information belonging to different information tags in the row of text data into different cells, to obtain the second table content.

When there is more than one row of text data to be split into columns, the server splits entity information belonging to different information tags in the same row of text data into different cells, and splits entity information belonging to the same information tag in different rows of text data into the same cell, to obtain the second table content.

Step 407: The server transmits the second table content to the client.

The server transmits the second table content to the client. The second table content include one or more columns of text data after the column splitting. In an embodiment, the server transmits the second table content to the client according to an account.

Step 408: The client receives the second table content transmitted by the server.

Step 409: The client displays the second table content in the online table interface, the second table content including one or more columns of text data after the column splitting.

In conclusion, in the method according to this embodiment, information extraction is performed by the server on one or more rows of text data in first table content to obtain an information tag in the rows of text data; and the rows of text data are split into one or more columns according to the information tag to obtain second table content. In this way, entity information belonging to different information tags can be split into different columns without relying on using a simple separator as a column-splitting condition, and instead, column splitting is performed by using a semantic meaning or feature of entity information, thereby improving accuracy and a success rate of the column-splitting function.

Figure 5:
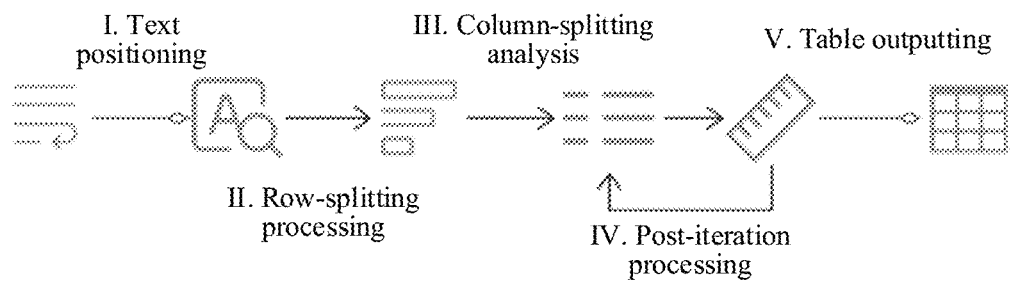
FIG. 5 is a flowchart of a method for automatically splitting table content into columns according to another exemplary embodiment of this application.

Referring to FIG. 5, a process in which the server splits the first table content into columns by using the AI technology is divided into five stages:

First stage: text positioning. Since there may be redundant information at the head and the end of the first table content, text data to be split into columns is first positioned in the first table content.

In an embodiment, the server recognizes an initial column-splitting position and an end column-splitting position of the text data to be split into columns. A text data segment located between the initial column-splitting position and the end column-splitting position is determined as the text data to be split into columns.

The server may comprehensively determine the initial column-splitting position and the end column-splitting position based on multi-dimensional information, for example, some keyword information (for example, solitaire and registration), regular serial numbers, and obvious line breaks or separators.

Second stage: row-splitting processing. The text data to be split into columns is split into rows of text data. Generally, each row of text data includes at least two pieces of entity information to be split into columns.

In an embodiment, the server performs row splitting based on a plurality of row-splitting rules, for example, performs row splitting based on a serial number, performs row splitting based on a space, performs row splitting based on a line break, or performs row splitting based on another separator.

Limited by the complexity of the text data to be split into columns, a small number of row-splitting errors may be introduced at this stage, that is, it cannot be ensured that the row-splitting result is 100% accurate.

Third stage: column-splitting analysis. This stage can include two sub-stages: information extraction+entity information alignment.

In the information extraction sub-stage, for each row of text data, information extraction is performed on the row of text data to obtain at least two pieces of entity information and information tags corresponding to the pieces of entity information.

In the entity information alignment sub-stage, the server aligns entity information having the same information tag into different rows of text data by using the information tags of the pieces of entity information, aligns the entity information having the same information tag into the same column, and aligns entity information having different information tags into different columns, to implement intelligent column splitting.

Fourth stage: post-iteration processing. The third stage is based on trusting the row-splitting result of the second stage. However, there is a possibility that a specific error exists in the row-splitting result of the second stage. Therefore, the column-splitting result in the third stage is utilized to minimize the row-splitting error and an error in each information extraction module, thereby improving fault tolerance.

A method on which this stage relies includes at least one of row splitting, line merging, and enumerated information reasoning.

Row splitting: A row of text data (abnormal row) that has been split is re-split, and column-splitting processing is performed again, to obtain a better column-splitting process.

Row merging: A plurality of rows of text data (abnormal rows) that have been split are merged and re-split, and column-splitting processing is performed again, to obtain a better column-splitting process.

Enumerated information reasoning: Entity information of an adjacent column is adjusted by using entity information of an enumerated information column. The enumerated information column means that values of entity information in the column are a limited number of enumerable values. For example, a gender column only includes two pieces of enumerated information, namely, "male" and "female", and when there is an extra Chinese character in the gender column, the extra Chinese character is usually entity information of an adjacent row.

Fifth stage: table outputting.

When there is no user-defined header, the server names a header of each column of cells according to a common information tag of entity information of the column. For example, when the information tag is a name, entity information of the column is named as name; and when the information tag is gender, entity information of the column is named as gender.

Figure 6:
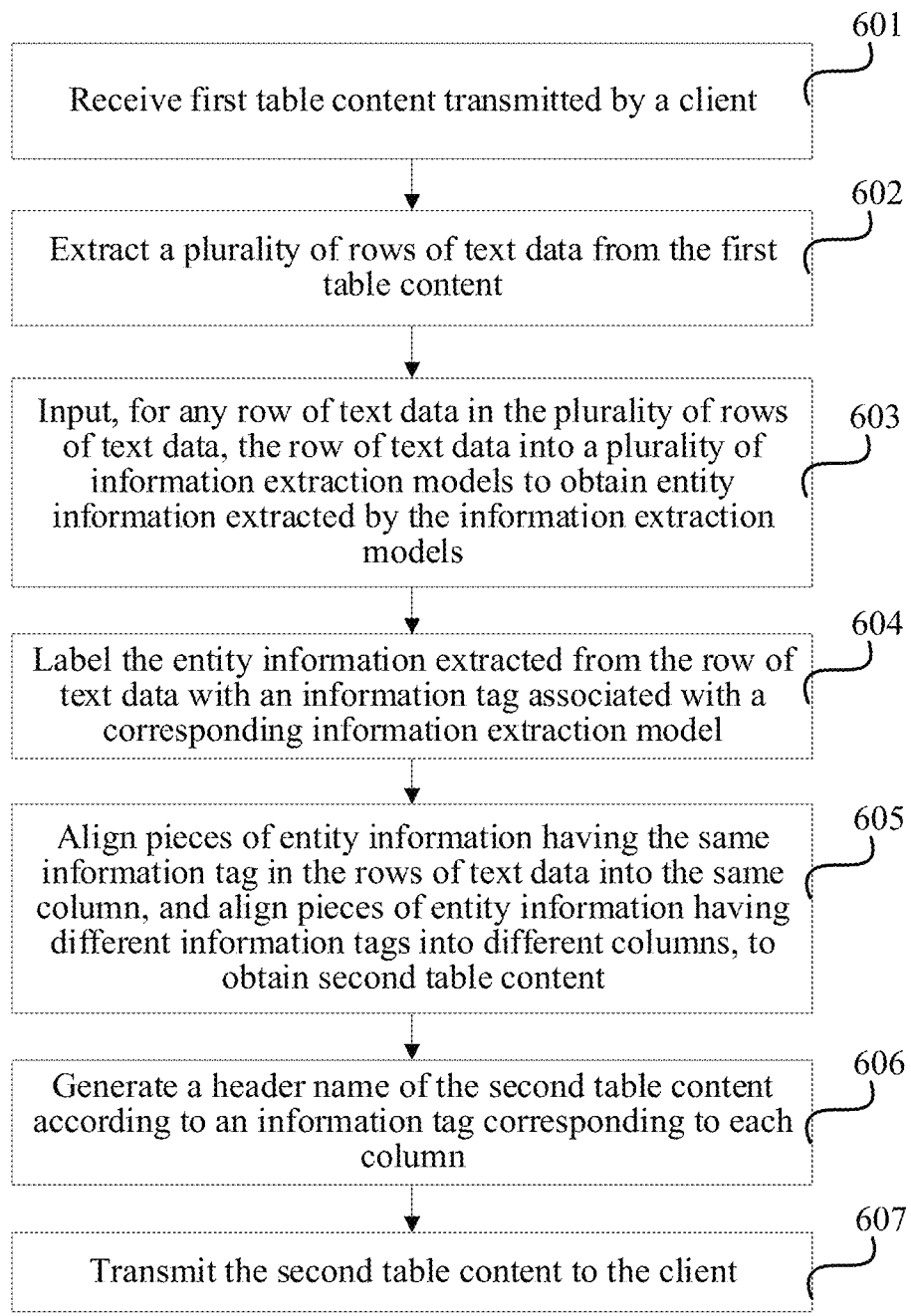
FIG. 6 is a flowchart of a method for automatically splitting table content into columns according to another exemplary embodiment of this application.

An exemplary embodiment is used below to exemplify the foregoing process. FIG. 6 is a flowchart of a method for automatically splitting table content into columns according to an exemplary embodiment of this application. This embodiment is described by using an example in which the method is applied to the server shown in FIG. 3. The method includes the following steps:

Step 601: Receive first table content transmitted by a client.

The first table content includes a row of text data to be split into columns. In an embodiment, the first table content is text data represented in a text form.

Step 602: Extract a plurality of rows of text data from the first table content.

The server recognizes an initial column-splitting position and an end column-splitting position of the text data to be split into columns in a text form. Row-splitting processing is performed on a text data segment located between the initial column-splitting position and the end column-splitting position, to obtain a plurality of rows of text data.

Exemplarily, referring to FIG. 7, the server recognizes, according to a keyword "接龙:", an initial column-splitting position 71, recognizes an end of first table content as an end column-splitting position 72, and determines a text data segment located between the initial column-splitting position 71 and the end column-splitting position 72 as a row of text data to be split into columns. Then the row of text data to be split into columns is split into a plurality of rows of text data according to serial numbers, as shown in FIG. 8.

The names and the book titles in FIG. 7 and FIG. 8 are all exemplary names or titles, and do not refer to users and books in the real world.

Step 603: Input, for any row of text data in the plurality of rows of text data, the row of text data into a plurality of information extraction models to obtain entity information extracted by the information extraction models.

A plurality of information extraction models are set in the server, and each information extraction model is configured to extract a type of entity information. The type can be represented by an information tag.

According to different tag types, the information extraction models include, but are not limited to, at least one of a model 1 for name extraction, a model 2 for gender extraction, a model 3 for age extraction, a model 4 for serial number extraction, a model 5 for kinship, a model 6 for time extraction, a model 7 for mobile phone number extraction, and a model 8 for identity card number extraction.

According to the different extraction principles, the information extraction models include, but are not limited to, at least one of a first information extraction model for information extraction by using a machine learning feature, a second information extraction model for information extraction by using an enumeration vocabulary, and a third information extraction model for information extraction by using a regular expression.

For any row of text data in the plurality of rows of text data, the server inputs the row of text data into a plurality of information extraction models separately to obtain entity information extracted by the information extraction models.

For example, a row of text data, "刘子瑞 多了一本英语2 课一试单元测试卷, 少了经典诵读", is inputted into the models 1 to 8 separately, and pieces of entity information, "刘子瑞", "多了一本英语 2 课一试单元测试卷", and "少了经典诵读", are extracted.

Step 604: Label the entity information extracted from the row of text data with an information tag associated with a corresponding information extraction model.

Since each piece of entity information in the row of text data is information extracted by using an information extraction model, and each information extraction model corresponds to a respective information tag. Therefore, any piece of entity information in the row of text data is labeled by using an information tag corresponding to the entity information model from which the entity information is extracted.

Step 605: Align pieces of entity information having the same information tag in the rows of text data into the same column, and align pieces of entity information having different information tags into different columns, to obtain the second table content.

For each row of text data, the server recognizes pieces of entity information in the row of text data, and an information tag corresponding to each piece of entity information.

According to the information tag of each entity information in each row of text data, the server aligns the entity information pairs with the same information tag to the same column, and aligns the entity information pairs with different information tags to different columns to get the second table content.

Step 606: Generate a header name of the second table content according to an information tag corresponding to each column.

When there is no header name in the second table content, since entity information in the same column has the same information tag, the server generates a header name of each column in the second table content according to an information tag corresponding to the column.

When there is a user-defined header name in the second table content, the user-defined header name can be used continuously, and this step is skipped.

Step 607: Transmit the second table content having the header name to the client.

The server transmits the second table content to the client, so that the client displays the second table content in the online table interface, the second table content including a row of text data after the column splitting.

Figure 9:
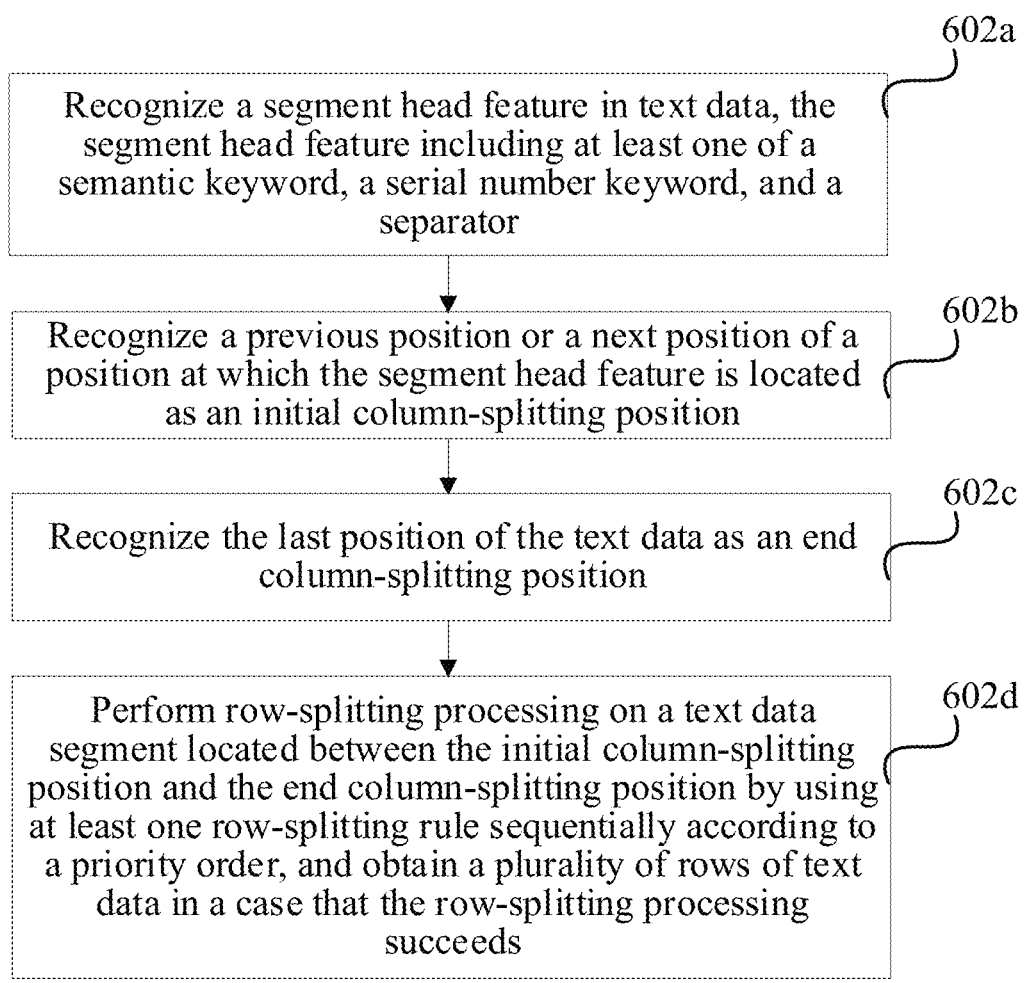
FIG. 9 is a flowchart of a method for automatically splitting table content into columns according to another exemplary embodiment of this application.

For the first stage and the second stage, namely, the text positioning stage and the row-splitting processing stage, the following embodiments may be referred to:

In an embodiment, the first table content is text data stored in a text form. Step 602 may include sub-steps 602a to 602d below, as shown in FIG. 9:

Sub-step 602a: Recognize a segment head feature in the text data, the segment head feature including at least one of a semantic keyword, a serial number keyword, and a separator.

The server recognizes, according to a priority order, the segment head feature in the text data corresponding to the first table content. The segment head feature includes at least one of a semantic keyword, a serial number keyword, and a separator. In an embodiment, a priority of the semantic keyword>a priority of the serial number keyword>a priority of the separator, where the symbol ">" means "greater than".

The server first recognizes a semantic keyword in the text data corresponding to the first table content, and when the semantic keyword is recognized, the semantic keyword is used as a segment head feature. The semantic keyword includes, but is not limited to, at least one of solitaire, registration, group buying, and statistics. A specific form of the semantic keyword is not limited in this embodiment.

When the semantic keyword is not recognized, the server recognizes a serial number keyword in the text data corresponding to the first table content, and when the serial number keyword is recognized, the serial number keyword is used as a segment head feature. The serial number keyword includes, but is not limited to, at least one of one, 1, ①, (1), and I. A specific form of the serial number keyword is not limited in this embodiment.

When the serial number keyword is not recognized, the server recognizes a separator that appears first in the text data corresponding to the first table content, and determines the separator that appears first as a segment head feature. The separator may be at least one of a space, a vertical-line separator, and a horizontal-line separator. A specific form of the separator is not specifically limited in this embodiment.

When the separator is not recognized, the segment head position of the text data corresponding to the first table content is directly determined as the initial column-splitting position.

Sub-step 602b: Recognize a previous position or a next position of a position at which the segment head feature is located as the initial column-splitting position.

When the segment head feature is a semantic keyword or a separator, a next position of a position at which the segment head feature is located is recognized as the initial column-splitting position. For example, when the segment head feature is a semantic keyword "接龙:", a next position of "接龙:" is recognized as the initial column-splitting position.

When the segment head feature is a serial number keyword, a previous position of the segment head feature is recognized as the initial column-splitting position. For example, when the segment head feature is a serial number keyword "1", a previous position of "1" is recognized as the initial column-splitting position.

Sub-step 602c: Recognize the last position of the text data as the end column-splitting position.

With reference to FIG. 7, it can be learned that: the server recognizes a text data segment between the initial column-splitting position 71 and the end column-splitting position 72 as text data to be split into rows.

Sub-step 602d: Perform row-splitting processing on a text data segment located between the initial column-splitting position and the end column-splitting position by using at least one row-splitting rule sequentially according to a priority order, and obtain the plurality of rows of text data when the row-splitting processing succeeds.

The server tries to perform row-splitting processing on the text data segment between the initial column-splitting position and the end column-splitting position by using at least one row-splitting rule sequentially according to a priority order, and obtains a plurality of rows of text data when the row-splitting processing succeeds. The row-splitting rule includes at least one of a serial number row-splitting rule, a space row-splitting rule, and a separator row-splitting rule.

The serial number row-splitting rule includes: a rule of splitting, when there are a plurality of serial numbers having consecutive values in the text data to be split into rows, the text data into rows according to a serial number position of each serial number, to obtain a plurality of rows of text data.

The space row-splitting rule includes: a rule of splitting, when there are a plurality of spaces in the text data to be split into rows, the text data into rows according to a position at which each space (spaces that consecutively appear can be regarded as one space) appears, to obtain a plurality of rows of text data.

The separator row-splitting rule includes: a rule of splitting, when there are a plurality of separators in the text data to be split into rows, the text data into rows according to a position at which each separator (separators that consecutively appear can be regarded as one separator) appears, to obtain a plurality of rows of text data.

The server first performs row-splitting processing on the text data by using the serial number row-splitting rule. When the row-splitting processing succeeds, a plurality of rows of text data are obtained. When the row-splitting processing fails, the server splits the text data into rows by using the space row-splitting rule. When the row-splitting processing succeeds, a plurality of rows of text data are obtained. When the row splitting fails, the server splits the text data into rows by using the separator row-splitting rule.

In conclusion, in the method provided in this embodiment, compatibility and accuracy of recognizing initial column-splitting positions of different pieces of text content can be improved by recognizing a segment head feature by using different recognizing methods by using a priority order. Even in different usage scenarios, when segment head features used by a user are different, the server can relatively accurately recognize the initial column-splitting position.

In the method provided in this embodiment, compatibility and accuracy of performing row-splitting processing in different row-splitting scenarios can be improved by performing row-splitting processing on the text data by using row-splitting rules by using a priority order. Even in different usage scenarios, when row-splitting symbols used by a user are different, the server can relatively accurately split different rows of text data.

For the third stage: column-splitting analysis. The column-splitting analysis stage can include: an entity information extraction sub-stage and an entity information alignment sub-stage.

Figure 10:
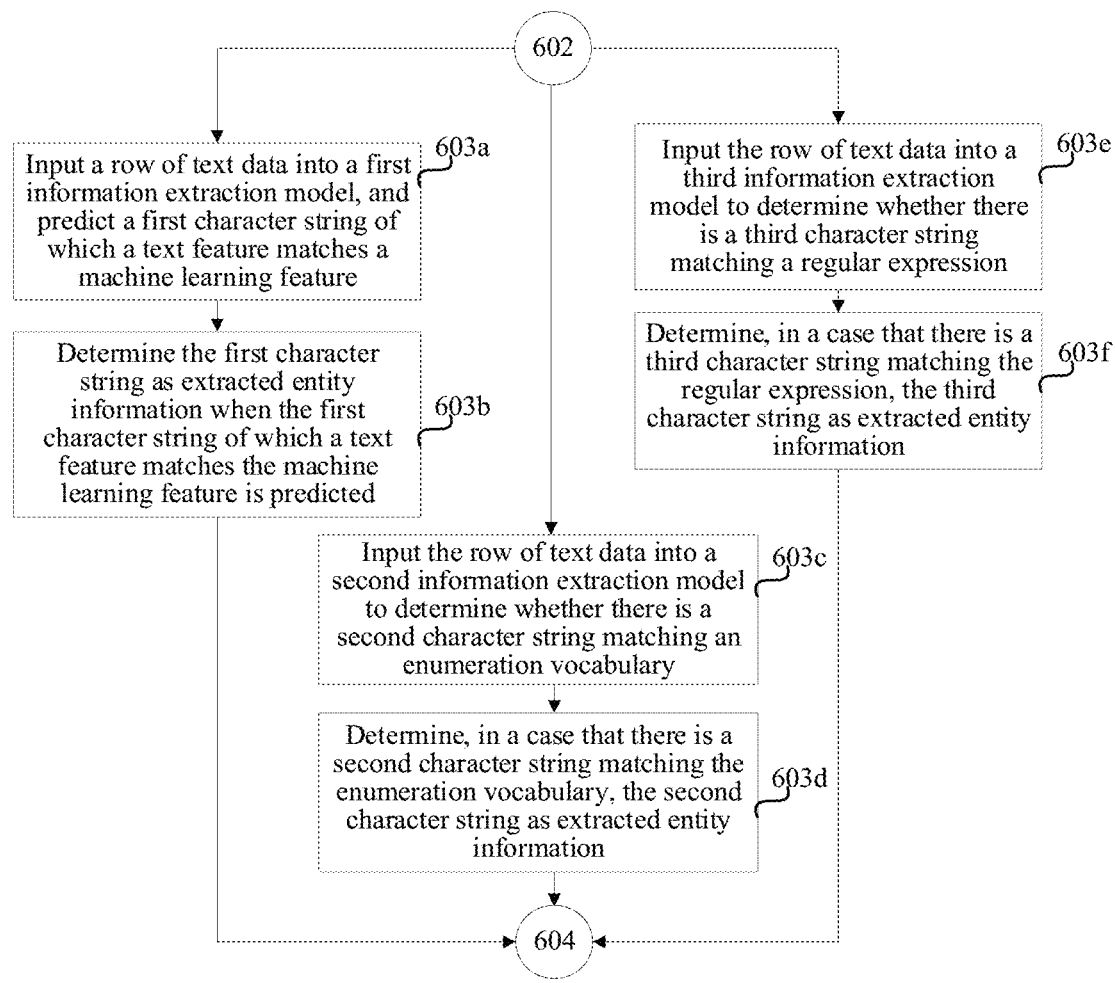
FIG. 10 is a flowchart of a method for automatically splitting table content into columns according to another exemplary embodiment of this application.

For the entity information extraction sub-stage, refer to the following embodiment:

In an embodiment, the information extraction model includes at least one of the following models: a first information extraction model for information extraction by using a machine learning feature, a second information extraction model for information extraction by using an enumeration vocabulary, and a third information extraction model for information extraction by using a regular expression. In this embodiment, an example in which all of the three models are included is used. Step 603 may include sub-steps 603a to 603f below, as shown in FIG. 10:

Sub-step 603a: Input the row of text data into the first information extraction model, and predict a first character string of which a text feature matches the machine learning feature.

In an embodiment, the first information extraction model is a machine learning model, and the machine learning model includes, but is not limited to, at least one of a named entity recognition model, a conditional random field model, a hidden Markov model, and a deep learning model.

In an embodiment, the first information extraction model is a model obtained through training by using a training sample in advance, and the training sample includes: manually labeled sample entity information and a sample information tag.

Sub-step 603b: Determine the first character string as the extracted entity information when the first character string of which a text feature matches the machine learning feature is predicted.

Using time recognition as an example, because there are various time formats, for example, at 3 o'clock tomorrow afternoon, booking a room for the 28th day of this month, and booking a room for a period from today to the 30th day of this month. In this embodiment of the application, the named entity recognition model may be used to recognize time information, to obtain first entity information having a time information tag.

Figure 11:
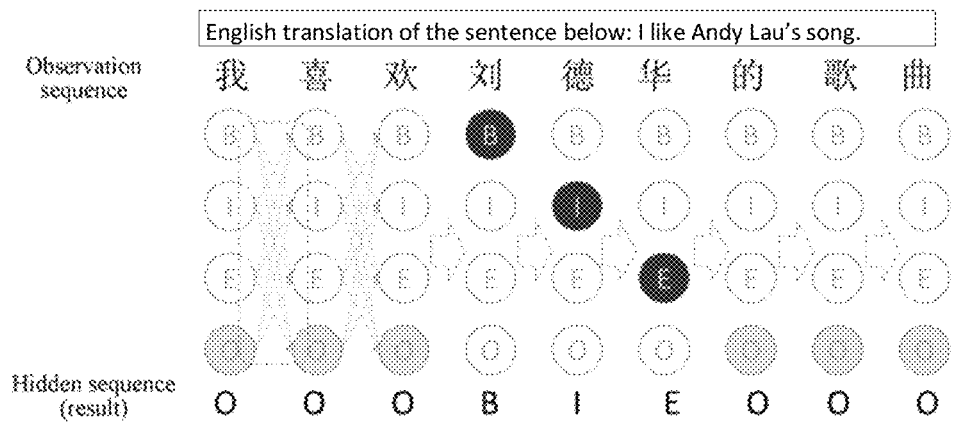
FIG. 11 is a flowchart of a method for automatically splitting table content into columns according to another exemplary embodiment of this application.

Using name recognition as an example, a sequence labeling model can be used to label a name. FIG. 11 is a schematic diagram of a principle of the sequence labeling model. For a given observation sequence "我喜欢刘德华的歌曲", the sequence labeling model uses a probability matrix to predict a hidden sequence "OOO-BIEOOO". That is, "刘德华" is a name.

B represents the first character of the name, I represents the middle character of the name, E represents the last character of the name, and O represents other characters. The probability matrix is configured to represent a probability of jumping from one state to another state in the observation sequence, for example, a probability of B→I is greater than a probability of B→O.

Sub-step 603c: Input the row of text data into the second information extraction model to determine whether there is a second character string matching the enumeration vocabulary.

Information types of some pieces of entity information are a limited number of pieces of information that are enumerable. For example, gender only includes two values, namely, male and female. In another example, kinship includes a range of enumerable information such as father, mother, grandmother on the father's side, grandfather on the father's side, grandmother on the mother's side, and grandfather on the mother's side.

For this type of entity information, an enumeration vocabulary corresponding to the entity information can be constructed in advance, and the enumeration vocabulary includes enumerated character strings. After the server inputs the row of text data into the second information extraction model, whether the row of text data matches any character string in the enumeration vocabulary is determined.

Sub-step 603d: Determine, when there is a second character string matching the enumeration vocabulary, the second character string as the extracted entity information.

Using kinship as an example, when there is a second character string "grandfather on the father's side" that matches the enumeration vocabulary, the second character string "grandfather on the father's side" in the row of text data is determined as the extracted entity information.

Sub-step 603e: Input the row of text data into the third information extraction model to determine whether there is a third character string matching the regular expression.

There is strong regularity in permutation laws of some pieces of entity information, such as mobile phone numbers, zip codes, and bank card numbers. The permutation laws of the pieces of entity information can be expressed by using regular expressions. The server stores the third information extraction model constructed based on regular expressions, and determines, in response to inputting the row of text data into the third information extraction model, whether there is a third character string matching the regular expression.

Using mobile phone number recognition as an example, a regular expression (?:(?<!\\d\\w)(1[0-9]{5}[0-9xX]{5})(?!\\d\\w)) may be used to recognize a mobile phone number.

Sub-step 603f: Determine, when there is a third character string matching the regular expression, the third character string as the extracted entity information.

When there is a third character string matching the regular expression in the row of text data, the third character string is determined as the extracted entity information.

Entity information of the same information tag can be extracted by using at least two different entity information models. For example, entity information of a name type can be extracted by using the first information extraction model and the second information extraction model in combination. This is not limited in this embodiment.

In conclusion, in the method provided in this embodiment, entity information in the row of text data is extracted by using different information extraction models, and information extraction can be performed by comprehensively using at least one type of feature in a machine learning feature, an enumeration characteristic, and a permutation law of the entity information, thereby improving a extraction success rate of entity information and extraction compatibility of different pieces of entity information.

Figure 12:
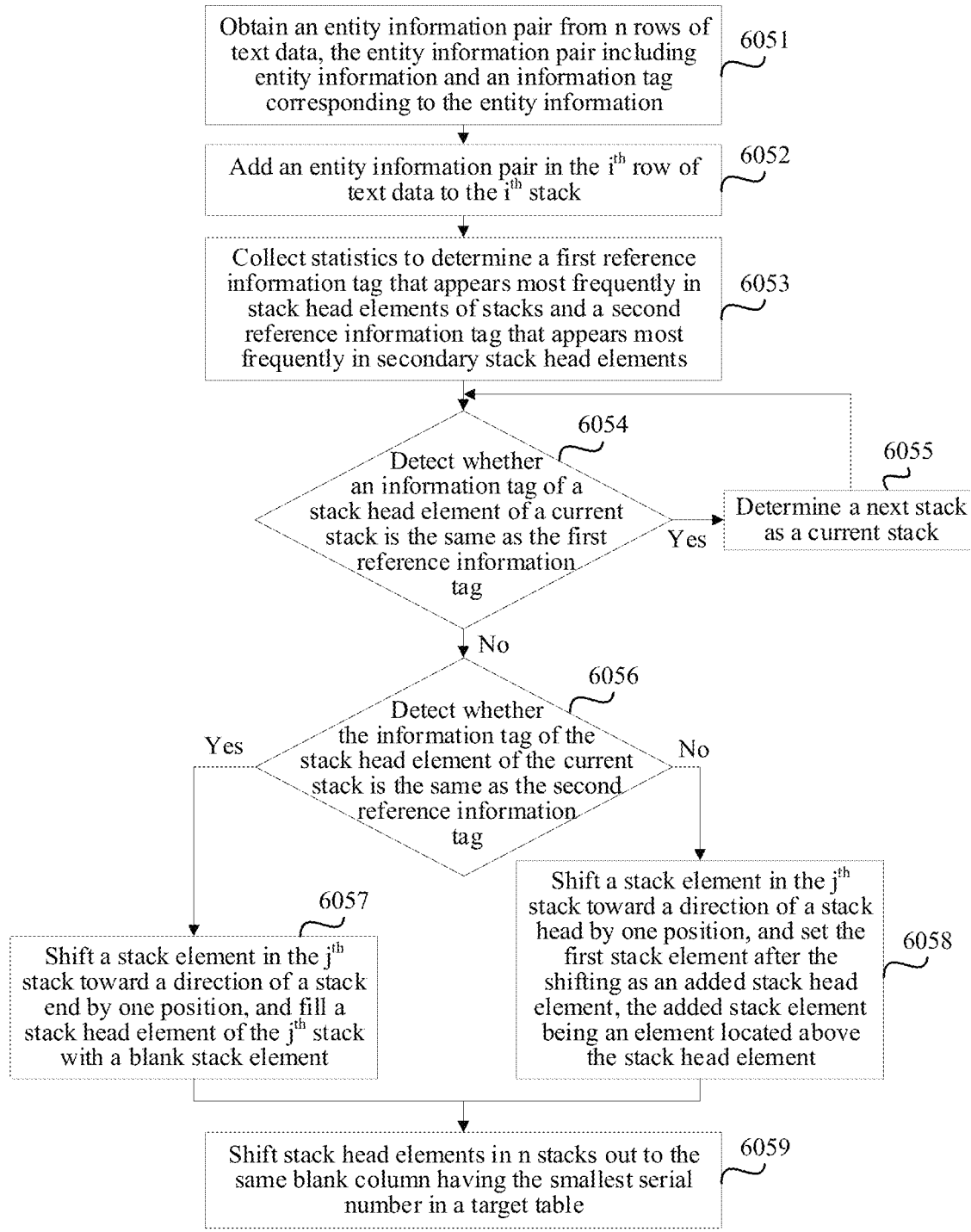
FIG. 12 is a flowchart of a method for automatically splitting table content into columns according to another exemplary embodiment of this application.

For the entity information alignment sub-stage, refer to the following embodiment:

In an embodiment, for step 605, the server may align, by using the following algorithm, pieces of entity information having the same information tag in the rows of text data into the same column, and align pieces of entity information having different information tags into different columns, to obtain the second table content. Step 605 may include sub-steps 6051 to 6059 below, as shown in FIG. 12.

Sub-step 6051: Obtain an entity information pair from n rows of text data, the entity information pair including the entity information and an information tag corresponding to the entity information, and n being a positive integer.

After the server performs entity information extraction on each row of text data, an entity information pair in the row of text data is obtained. Entity information pairs in the same row of text data can be sorted according to an appearance order of entity information.

In an embodiment, an extraction result of each row of text data may be represented as: $r_i=[(t_1, c_1), \ldots, (t_m, c_m)]$, where ri represents the same row of text data, $t_i$ represents the ith entity information in the row of text data, and ci represents an information tag of the ith entity information, where i is a positive integer not greater than m. Each pair of parentheses represents an entity information pair. Different entity information pairs are sorted according to an appearance order of entity information in the row of text data.

Sub-step 6052: Add an entity information pair in the ith row of text data to the ith stack, the row of text data corresponding to the stack in a one-to-one manner, and i being a positive integer not greater than n.

The server initializes n stacks, and there is a one-to-one correspondence between n rows of text data and the n stacks.

The server adds each entity information pair in the ith row of text data as a stack element to the ith stack. In an embodiment, the server adds an entity information pair that appears last to a stack end according to an appearance order of the entity information pair, and adds an entity information pair that appears the earliest to a stack head.

The same stack includes a plurality of stack elements. A stack element located at a stack head is referred to as a stack head element, a stack element located at a stack end is referred to as a stack end element, and a stack element located next to the stack head element is referred to as a secondary stack head element.

Based on the same processing method, entity information pairs in the n rows of text data are added to respective stacks corresponding thereto, to obtain n stacks.

In an embodiment, the server ensures that the n stacks have the same quantity of entity information pairs by filling in a stack end element (a blank stack element). That is, when the n rows of text data have different quantities of entity information pairs, a maximum quantity of entity information pairs in the stacks is determined, and a stack end of a stack of which a quantity of entity information pairs is less than the maximum quantity is filled with a blank stack end element, so that all the stacks have the maximum quantity of stack elements.

Sub-step 6053: Collect statistics to determine a first reference information tag that appears most frequently in stack head elements of the stacks and a second reference information tag that appears most frequently in secondary stack head elements.

For the stack head element and the secondary stack head element of each stack, statistics are collected to determine a first reference information tag that appears most frequently in stack head elements of the stacks, for example, the first reference information tag is "name"; and statistics are collected to determine a second reference information tag that appears most frequently in secondary stack head elements, for example, the second reference information tag is "gender".

The secondary stack head element is a stack element located next to the stack head element. When the stack head is at the top, and the stack end is at the bottom, the secondary stack head element is a stack element located below the stack head element; and when the stack head is on the left, and the stack end is on the right, the secondary stack head element is a stack element located to the right of the stack head element.

Figure 13:
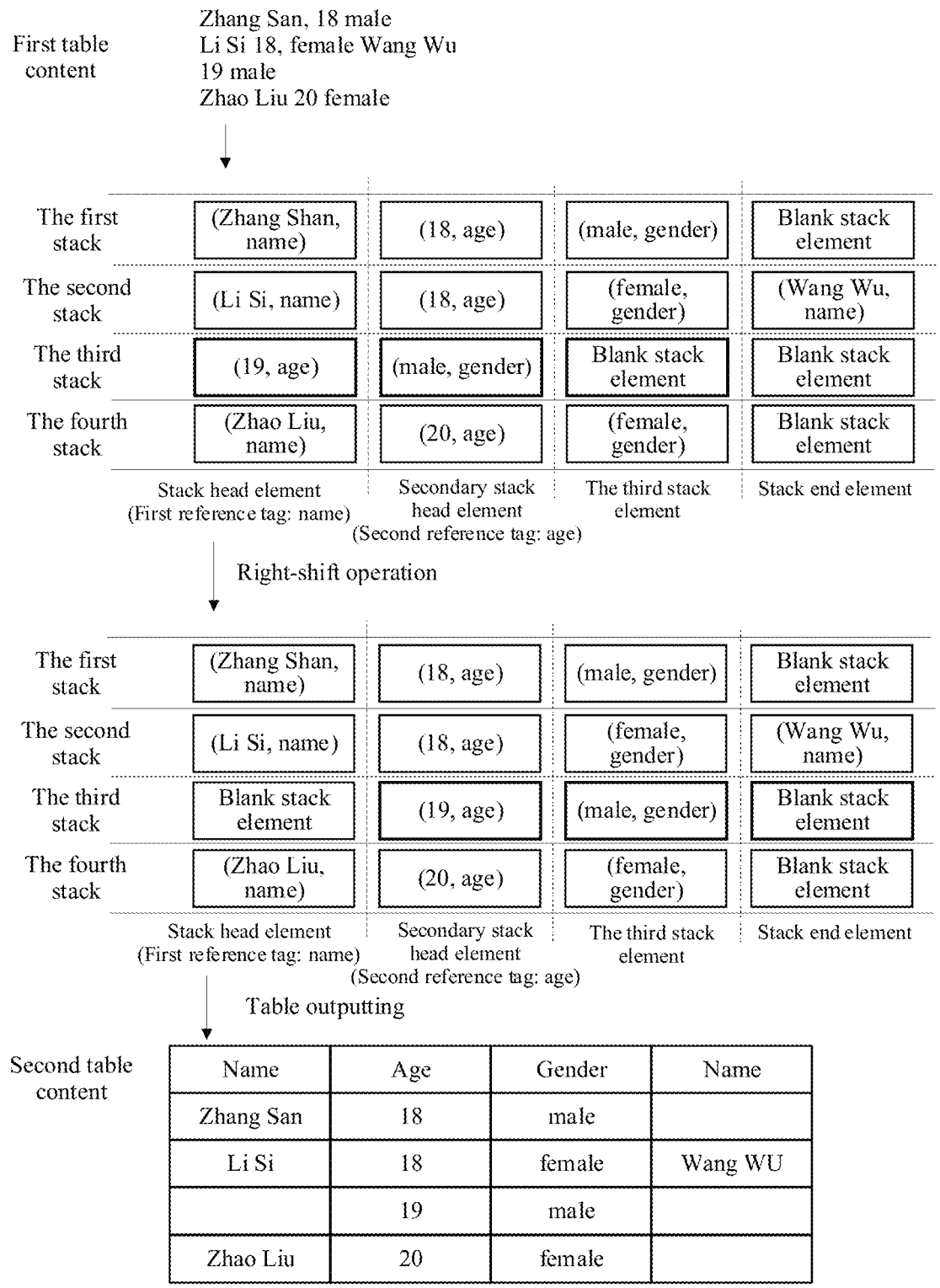
FIG. 13 is a schematic diagram of an alignment process according to another exemplary embodiment of this application.

With reference to FIG. 13, there are four stack elements in all of the stacks. Statistics are collected to determine that a first reference information tag that appears most frequently in stack head elements of the stacks is "gender" and a second reference information tag that appears most frequently in secondary stack head elements is "age".

Sub-step 6054: Determine whether an information tag of a stack head element of a current stack is the same as the first reference information tag.

The current stack is any one of the n stacks. In this embodiment, the current stack being the jth stack is as an example.

When the information tag of the stack head element of the current stack is the same as the first reference information tag, sub-step 6055 is performed. When the information tag of the stack head element of the current stack is different from the first reference information tag, sub-step 6056 is performed.

Sub-step 6055: Determine a next stack as a current stack when the information tag of the stack head element of the current stack is the same as the first reference information tag.

When the current stack is not the last stack, the detection is performed on a stack head element of a next stack. When the current stack is the last stack, sub-step 6056 is performed.

Sub-step 6056: Detect, when the information tag of the stack head element of the current stack is different from the first reference information tag, whether the information tag of the stack head element of the current stack is the same as the second reference information tag.

When there is an information tag of a stack head element in the jth stack that is different from the first reference information tag and that is different from the second reference information tag, sub-step 6057 is performed.

When there is an information tag of a stack head element in the jth stack that is different from the first reference information tag and that is the same as the second reference information tag, sub-step 6058 is performed.

Sub-step 6057: Shift, when an information tag of a stack head element in the jth stack is different from the first reference information tag, but is the same as the second reference information tag, a stack element in the jth stack toward a direction of a stack end by one position, and fill a stack head element of the jth stack with a blank stack element.

In this case, the stack head element in the jth stack is shifted to be the secondary stack head element.

When the stack head is at the top, and the stack end is at the bottom, the server shifts all stack elements in the jth stack downward by one position, and in this case, a stack head element becomes a secondary stack head element.

When the stack head is on the left, and the stack end is on the right, the server shifts all stack elements in the jth stack rightward by one position, and in this case, a stack head element becomes a secondary stack head element.

In an embodiment, the server further fills a position of the original stack head element with a blank stack element. j is a positive integer not greater than n.

With reference to FIG. 13, a stack head element in the third stack is (19 age), and an information tag of the stack head element is different from the first reference information tag "name", but is same as the second reference information tag "age". All stack elements in the third stack are shifted rightward, and a stack head position of the third stack is filled with a blank stack element.

Sub-step 6058: Shift, when an information tag of a stack head element in the jth stack is different from the first reference information tag and is different from the second reference information tag, a stack element in the jth stack toward a direction of a stack head by one position, and set the first stack element after the shifting as an added stack head element, the added stack element being an element located above the stack head element.

When the stack head is at the top, and the stack end is at the bottom, the server shifts all stack elements in the jth stack upward by one position, and in this case, the original stack head element becomes an added stack element above the current stack head element, and a vacant stack element position is filled with a blank stack element.

When the stack head is on the left, and the stack end is on the right, the server shifts all stack elements in the jth stack leftward by one position, and in this case, the original stack head element becomes an added stack element located to the left of the current stack head element, and a vacant stack element position is filled with a blank stack element.

Figure 14:
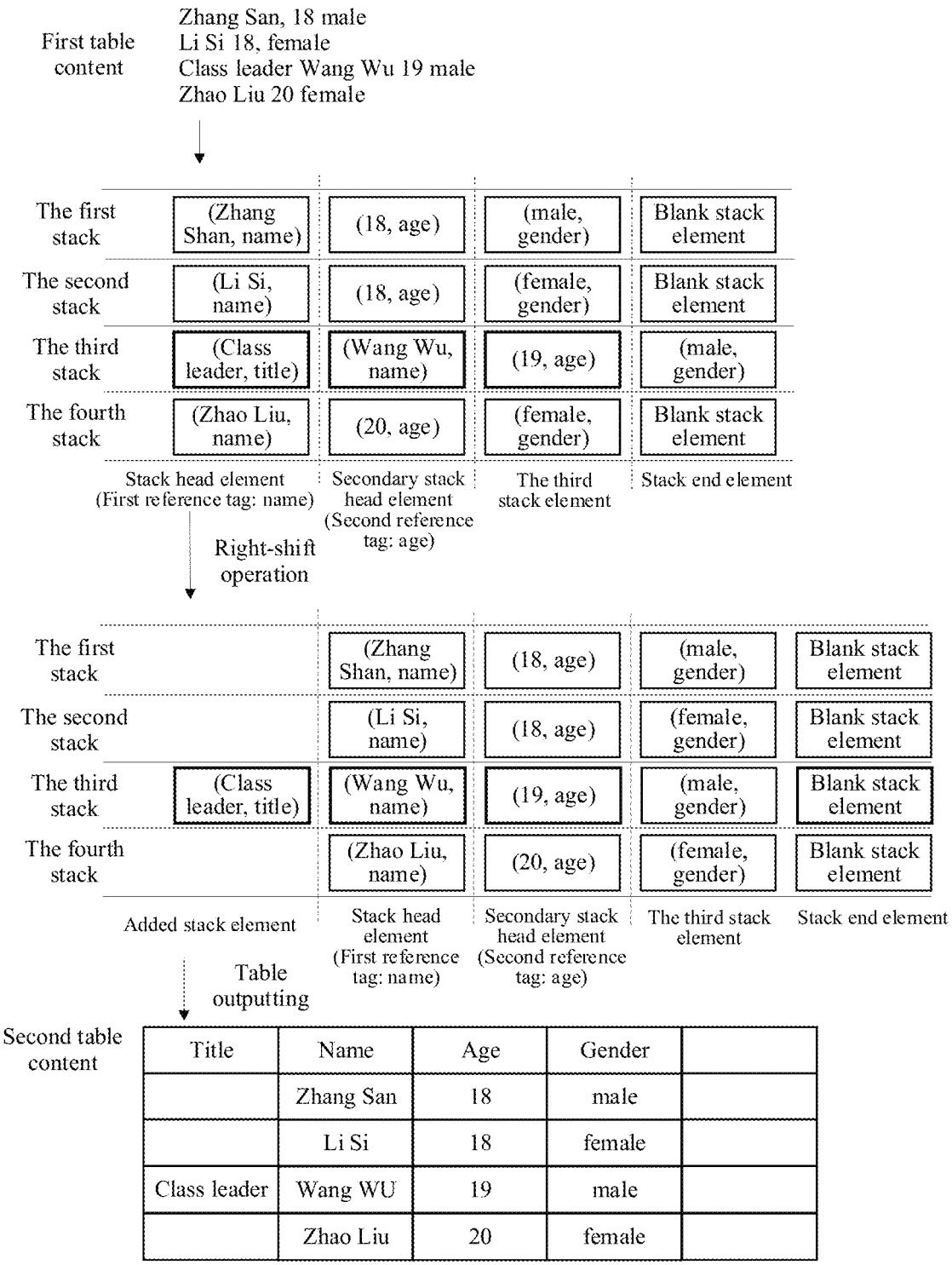
FIG. 14 is a schematic diagram of an alignment process according to another exemplary embodiment of this application.

With reference to FIG. 14, a stack head element in the third stack is (class leader, title), and an information tag of the stack head element is different from the first reference information tag "name", and is different from the second reference information tag "age". All stack elements in the third stack are shifted leftward, the original stack head element (class leader, title) is set as an added stack element, and a stack head position of the third stack is filled with a blank stack element.

Sub-step 6059: Shift, when information tags of stack head elements in the n stacks are all the first reference information tags, the stack head elements in the n stacks out to the same blank column having the smallest serial number in a target table.

In an embodiment, the target table is a blank table located in a cache, or the target table is a table area selected by the user.

When information tags of stack head elements in the n stacks are all the first reference information tags, the stack head elements in the n stacks are all shifted out to the same blank column having the smallest serial number in a target table. If there are n stack elements in each stack, such a shifting-out process may be executed n times. In an embodiment, when all of the information tags of the stack head elements in the n stacks are the first reference information tag, and there is an added stack element, the added stack element is inserted into an added column at an output position, and the added column is a table column between a blank column having the smallest serial number and a non-blank column having the largest serial number.

With reference to FIG. 14, a stack head element of which an information tag is "name" is shifted to the first column, and then, an added stack element "title" is inserted into an added column between the 0th column and the first column.

In an exemplary example, the foregoing alignment process can be implemented by using the following alignment algorithm:

Input: an extraction result of each row: $r_i=[(t_1, c_1), \ldots, (t_m, c_m)]$, where ri represents the same row of text data, ti represents the ith entity information in the row of text data, and ci represents an information tag of the ith entity information, where i is a positive integer not greater than m.

Output: aligned table T, where a table column is H.

1: Initialize a stack S and H, add extraction results of all rows to the stack $S_i$ sequentially, and perform filling, to make all the rows in the stack have the same quantity of elements.

2: End the algorithm when the stack S=Ø; otherwise, perform step 3.

3. Find the most common information tag m_t from stack head elements of all the rows, where m_t≠'PAD', determine, if m_t='NAME', whether all of the t≠'NAME' elements of the stack are names, and if yes, modify the information tag.

4. Perform a shift-left or shift-right operation on a t≠m_t element at a stack head of each row, and then, fill S; if an information tag t is consistent with the most common information tag of the secondary stack head element, perform right-shift; and if the information tag t is not consistent with the most common information tag of the secondary stack head element, perform left-shift.

In this embodiment, an example in which the stack head is on the left, and the stack end is on the right is used.

Right-shift refers to shifting the stack head element to a secondary stack head element. In an embodiment, all stack elements in the stack are shifted right, and each stack is filled with a blank stack element, so that all the stack have the same quantity of elements.

Left-shift refers to shifting the stack head element to an added stack element, where the added stack element is located to the left of the stack head element. For example, if the stack head element is numbered 0, and the secondary stack head element is 1, the added stack element is numbered −1.

5. If all the stack head elements have the same information tag, shift out the stack head elements of all the rows, add the stack head elements to the table T, in addition, add the information tag t to H, and perform step 2.

In an embodiment, the information tag t is added to the table column name H as a header.

In conclusion, in the method provided in this embodiment, the alignment algorithm is implemented by using a plurality of stacks, so that pieces of entity information having the same information tag are split into the same column, and pieces of entity information having different information tags are split into different columns. Even if there are some information tags that are abnormal tags, alignment can be achieved through a left-shift or right-shift operation, so that the alignment algorithm has extremely high fault tolerance.

Figure 15:
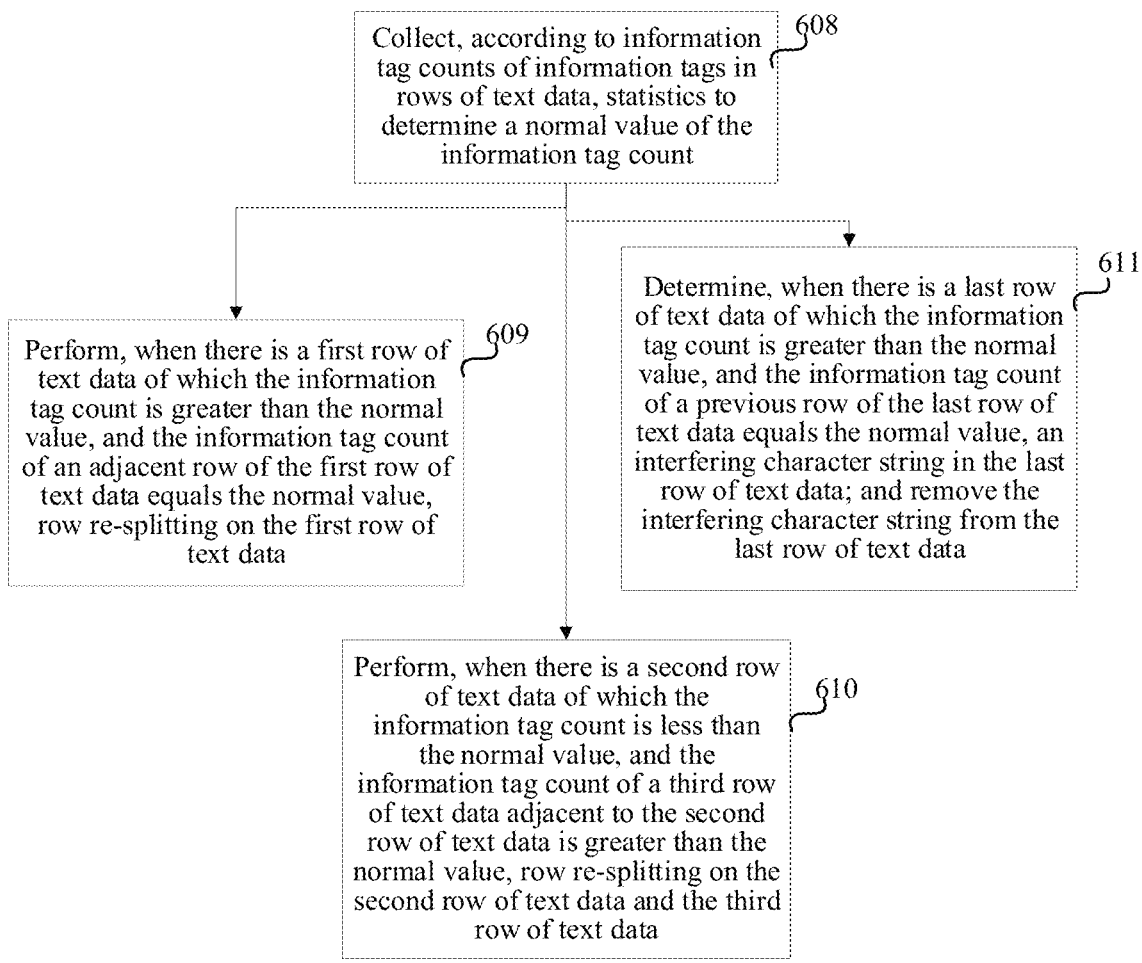
FIG. 15 is a flowchart of a method for automatically splitting table content into columns according to another exemplary embodiment of this application.

For the fourth stage, namely, the post-iteration processing stage, refer to the following embodiment:

In an embodiment, after step 605, steps 608 to 611 below are further included, as shown in FIG. 15:

Step 608: Collect, according to information tag counts of the information tags in the rows of text data, statistics to determine a normal value of the information tag count.

There may be a plurality of rows of text data. The server collects statistics to determine information tag counts of the information tags in the rows of text data, and collect statistics to determine a normal value of the information tag count in the rows of text data.

For example, if an information tag count of the first row of text data is 3, an information tag count of the second row of text data is 3, an information tag count of the third row of text data is 6, and an information tag count of the fourth row of text data is 3, the server may collect statistics to determine that the normal value of the information tag count is 3.

Step 609: Perform, when there is a first row of text data of which the information tag count is greater than the normal value, and the information tag count of an adjacent row of the first row of text data equals the normal value, row re-splitting on the first row of text data.

When there is a first row of text data of which the information tag count is greater than the normal value (or a multiple of the normal value), and the information tag count of an adjacent row of the first row of text data equals to the normal value, it indicates that the first row of text data is an abnormal row in which there is a row-splitting error, and it is very likely that a plurality of rows of content are split into the same row of text data.

The server performs row re-splitting on the first row of text data according to the information tags in the first row of text data, and performs column re-splitting on the rows of text data after the row re-splitting. For example, when the information tag count in the first row of text data is n times the normal value, the first row of text data is re-split into n rows of text data according to the information tags.

Figure 16:
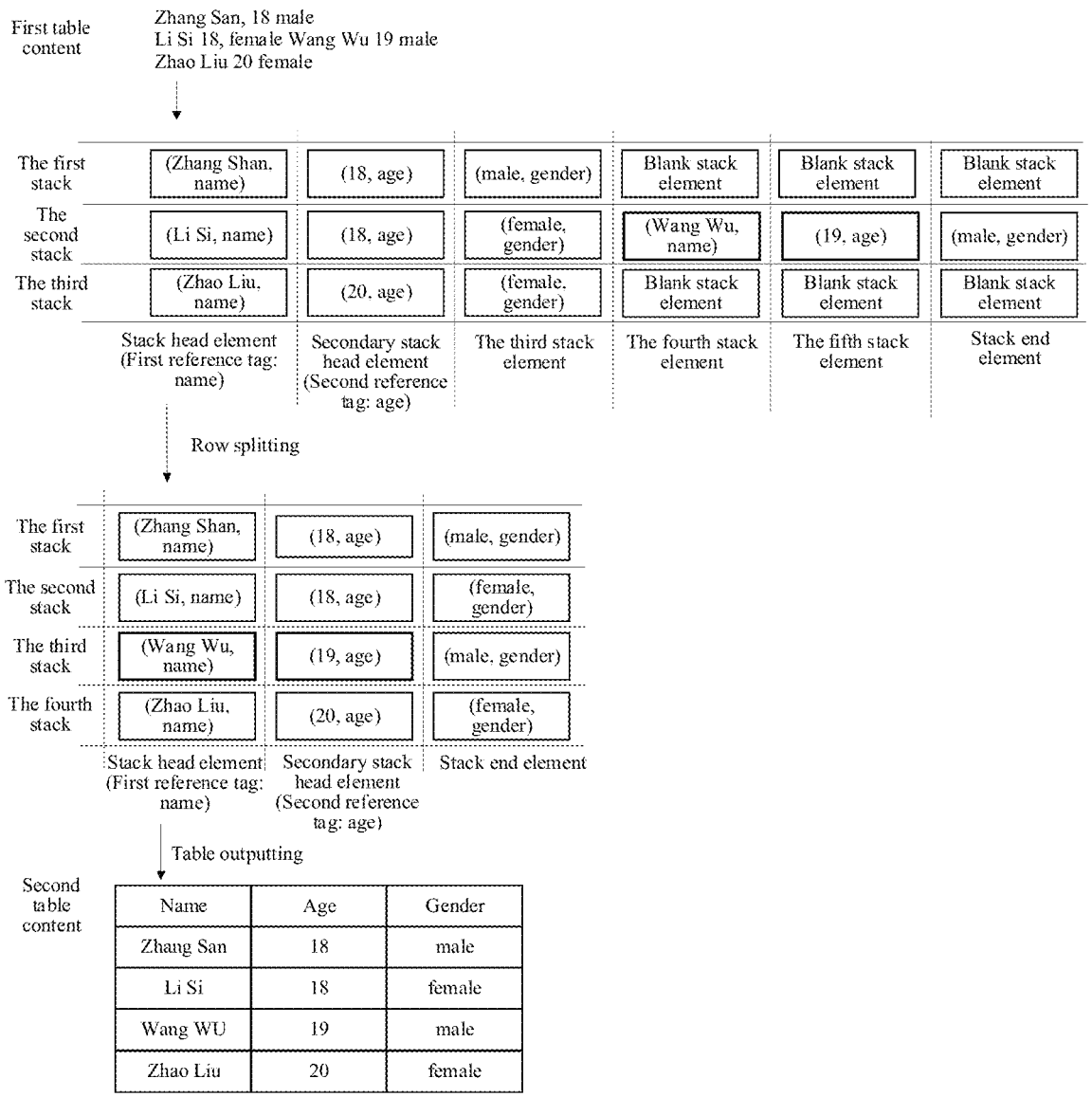
FIG. 16 is a schematic diagram of an alignment process according to another exemplary embodiment of this application.

With reference to FIG. 16, when information tags corresponding to a row of text data in the second stack include "name, gender, age, name, gender, age", the server splits the row of text data in the second stack into two rows of text data according to "name, gender, age" and "name, gender, age", and then, column re-splitting is performed.

Step 610: Perform, when there is a second row of text data of which the information tag count is less than the normal value, and the information tag count of a third row of text data adjacent to the second row of text data is greater than the normal value, row re-splitting on the second row of text data and the third row of text data.

When there is a second row of text data of which the information tag count is greater than the normal value, and the information tag count of an adjacent third row of text data is greater than the normal value, it indicates that the second row of text data and the third row of text data are abnormal row in which there is a row-splitting error, and it is very likely that there are errors at column-splitting positions of the second row of text data and the third row of text data.

After the server merges the second row of text data and the third row of text data into a piece of merged text data, row-re-splitting is performed on the merged text data according to information tags, and column re-splitting is performed on the rows of text data after the row re-splitting.

Figure 17:
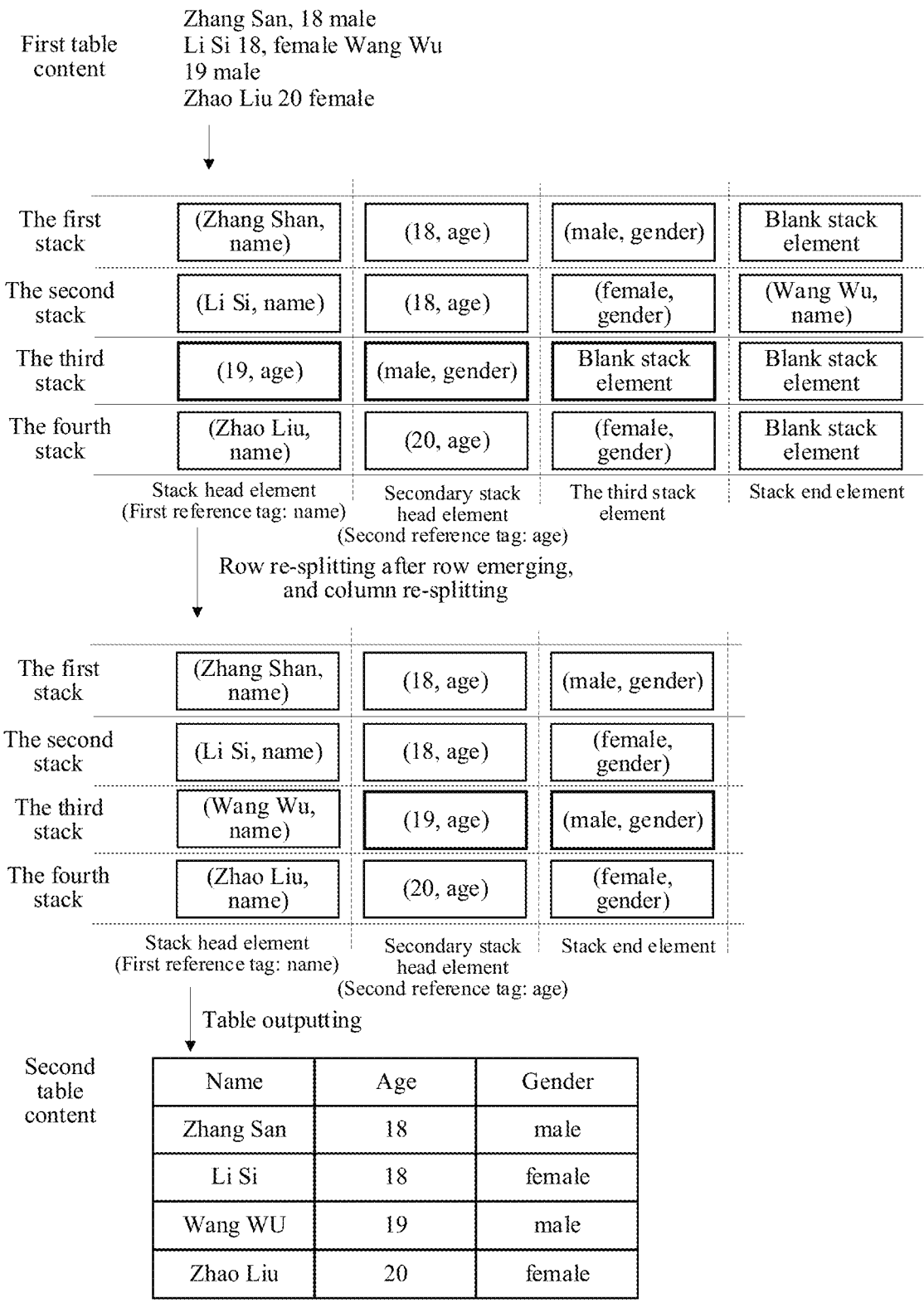
FIG. 17 is a schematic diagram of an alignment process according to another exemplary embodiment of this application.

With reference to FIG. 17, when information tags corresponding to a row of text data in the third stack include "gender, age", and information tags corresponding to a row of text data in the second stack include "name, age, gender, name", the server emerges the rows of text data of the second stack and the third stack, and performs row re-splitting to obtain two rows of text data that are split according to "name, gender, age" and "name, gender, age".

Step 611: Determine, when there is a last row of text data of which the information tag count is greater than the normal value, and the information tag count of a previous row of the last row of text data equals the normal value, an interfering character string in the last row of text data; and remove the interfering character string from the last row of text data.

When there is a last row of text data of which the information tag count is greater than the normal value, and the information tag count of a previous row of the last row of text data equals the normal value, it indicates that there is redundant information in the last row of text data.

The server determines, according to information tags in the last row of text data, an interfering character string in the last row of text data, and removes the interfering character string from the last row of text data.

The foregoing process can be iteratively implemented a plurality of times, to obtain corrected second table content. The server generates a header name of the corrected second table content according to an information tag corresponding to each column, and transmits the corrected second table content having the header name to the client.

In conclusion, in the method provided in this embodiment, statistics are collected to determine a normal value (also referred to as the most common value) of an information tag count of each row of text data, and row splitting or row merging is performed by using the normal value of the information tag count, so that even if there is a column-splitting error in the second stage, automatic error correction can be performed by using the tag of the third stage, to obtain a more accurate column-splitting result through iteration and reduce inaccurate column-splitting phenomena caused by row splitting errors.

In terms of human-computer interaction, a user has at least two different modes of enabling a column-splitting function:

triggering the column-splitting function after copy-and-paste; and triggering the column-splitting function after area selection.

Figure 18:
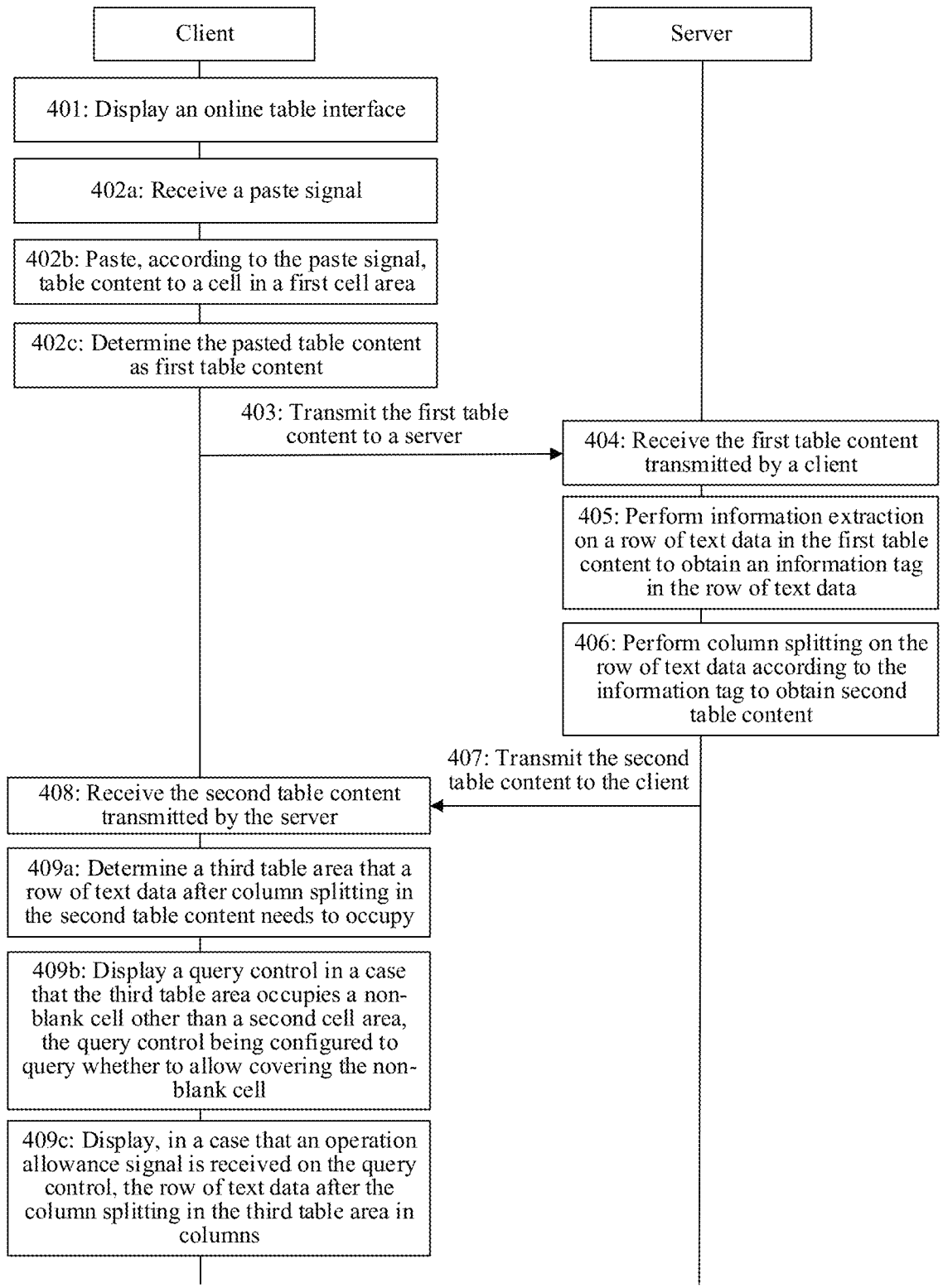
FIG. 18 is a flowchart of a method for automatically splitting table content into columns according to another exemplary embodiment of this application.

For the first column-splitting function triggering mode, refer to the following embodiment:

In an embodiment, the client determines first table content according to copy and paste operations of a user, and step 402 can be alternatively implemented as sub-steps 402*a* to 402*c*, as shown in FIG. 18:

Sub-step 402*a*: Receive a paste signal.

After an online table interface is displayed, a user may copy text information from another data source to the online table interface. Then, the user may paste the text information in the client.

The client receives a paste signal of the user. The paste signal may be a signal indicating that a paste option in a right-click menu of a mouse is clicked, or may be a shortcut-key paste signal, for example, the Ctrl+V signal.

Sub-step 402*b*: Paste, according to the paste signal, table content to a cell in a first cell area.

The client pastes copied content of a clipboard to a cell in a first cell area according to the paste signal of the user. The first cell area includes at least one cell. In an embodiment, the first cell area includes a plurality of cells located in the same column.

Sub-step 402*c*: Determine the pasted table content as the first table content.

The client determines the table content pasted from the clipboard as the first table content.

Figure 19:
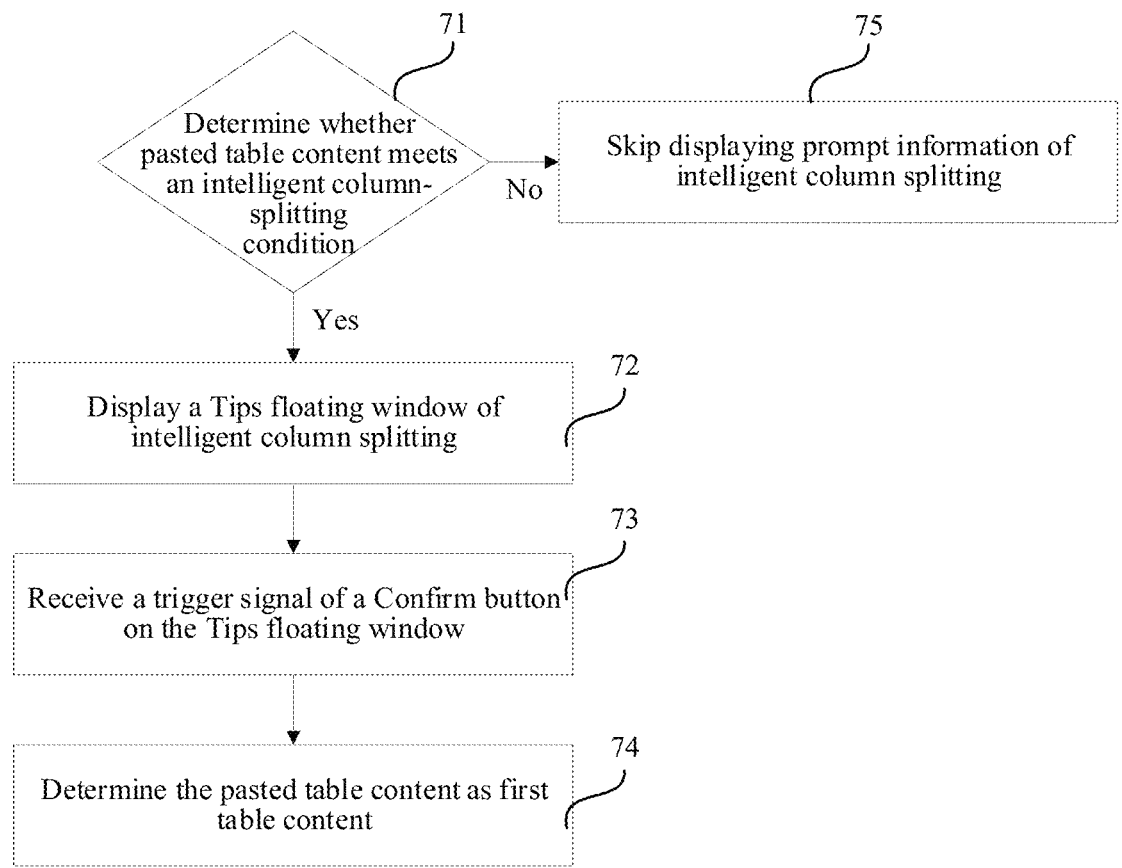
FIG. 19 is a flowchart of a method for automatically splitting table content into columns according to another exemplary embodiment of this application.

In an exemplary example shown in FIG. 19, sub-step 402*c* includes the following steps:

Step 71: Determine whether the pasted table content meets an intelligent column-splitting condition.

When the intelligent column-splitting condition is met, step 72 is performed. When the intelligent column-splitting condition is not met, step 75 is performed.

In an embodiment, the intelligent column-splitting condition includes, but is not limited to, at least one of the following conditions: the pasted table content is one column, the pasted table content is text information, and the pasted table content does not include a picture.

Step 72: Display a Tips floating window of intelligent column splitting.

When the pasted table content meets the intelligent column-splitting condition, the client displays query information for querying whether to perform intelligent column splitting. The query information can be displayed by using the Tips floating window.

For example, the client displays a Tips floating window, and the Tips floating window displays: Whether to perform intelligent column splitting on the pasted content, confirm or cancel. "Confirm" and "Cancel" are clickable button controls.

Step 73: Receive a trigger signal of the Confirm button on the Tips floating window.

When receiving a click operation on the Confirm button, the client receives a trigger signal on the Confirm button in the Tips floating window, and performs step 74.

When receiving a click operation on the Cancel button, the client receives a trigger signal on the Cancel button in the Tips floating window, and cancels displaying of the Tips floating window.

Step 74: Determine the pasted table content as the first table content.

Step 75: Skip displaying prompt information of intelligent column splitting, and only respond to the paste operation.

In conclusion, in the method provided in this embodiment, when a user performs copy and paste operations in the online table interface, enabling of the intelligent column-splitting function is triggered, which is relatively suitable for a use scenario in which the user aggregates data from other text information sources, so that column-splitting efficiency during data aggregation is improved.

Figure 20:
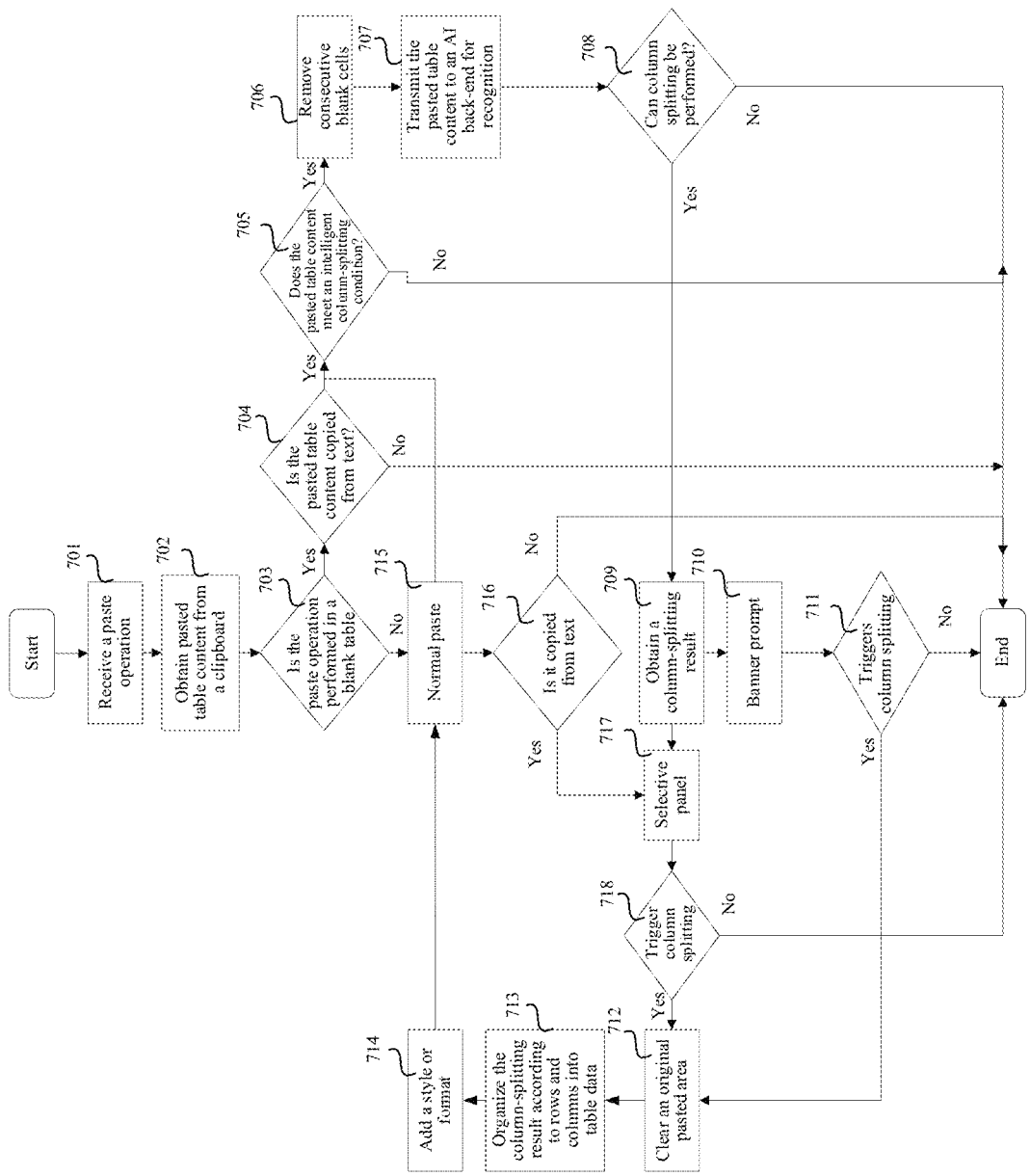
FIG. 20 is a flowchart of a method for automatically splitting table content into columns according to another exemplary embodiment of this application.

In an exemplary example, using the client being a web-based front-end program as an example, a process of triggering an automatic column-splitting function through copy and paste operations is described. Exemplarily, as shown in FIG. 20, the method for automatically splitting table content into columns includes the following steps:

Step 701: A front-end program receives a paste operation.

Step 702: The front-end program obtains pasted table content from a clipboard.

Step 703: The front-end program determines whether to perform the paste operation in a blank table.

If the paste operation is performed in a blank table, step 704 is performed. If the paste operation is performed in a non-blank table, step 715 is performed.

Step 704: The front-end program determines whether the pasted table content is copied from text.

A data source of the copied content is stored in the clipboard. When the data source is a source such as a web page, chat history, or an email, it is considered that the pasted table content is copied from text.

If the pasted table content is copied from text, step 705 is performed. If the pasted table content is not copied from text (for example, copied from another Excel table), this process is ended.

Step 705: The front-end program determines whether the pasted table content meets the intelligent column-splitting condition.

In an embodiment, the intelligent column-splitting condition includes, but is not limited to, at least one of the following conditions: the pasted table content is one column, the pasted table content is text information, and the pasted table content does not include a picture.

If the intelligent column-splitting condition is met, step 706 is performed. If the intelligent column-splitting condition is not met, this process is ended.

Step 706: The front-end program removes consecutive blank cells.

When there are consecutive blank cells in the pasted table content, the front-end program removes the consecutive blank cells.

When there are consecutive blank cells in the pasted table content, the front-end program replaces the consecutive blank cells with a single blank cell.

Step 707: The front-end program transmits the pasted table content to an AI back-end for recognition.

The AI back-end may be a server, and an AI-based information extraction model is integrated in the server.

Step 708: The server determines whether column splitting can be performed.

When column splitting can be performed on the pasted table content, a column-splitting result is generated and transmitted to the client, and step 709 is performed.

When column splitting cannot be performed on the pasted table content, the process is ended.

Step 709: The front-end program obtains a column-splitting result.

The front-end program obtains a column-splitting result from the server.

Step 710: The front-end program displays a banner prompt for the column-splitting result in the online table interface.

This banner prompt is used to prompt a user that there is an intelligent column-splitting result of the pasted table content.

Step 711: The front-end program determines whether a user triggers a column-splitting option.

When the user triggers the column-splitting option, step 712 is performed. When the user does not trigger the column-splitting option, this process is ended.

Step 712: The front-end program clears an original pasted area.

The front-end program clears an initial pasted area of the user.

Step 713: The front-end program organizes the column-splitting result according to rows and columns into table data (second table content).

Step 714: The front-end program adds a style or format to the second table content.

Step 715: The front-end program performs a normal paste operation.

If the normally pasted content is the second table content, the second table content is displayed on the online table interface.

As another branch of step 703, if the user performs the paste operation in a non-blank table, the front-end program first normally pastes the pasted form content, and transmits the pasted form content to the AI back-end for intelligent column splitting when the intelligent column-splitting condition is met.

Step 716: The front-end program determines whether the pasted table content is copied from text.

A data source of the copied content is stored in the clipboard. When the data source is a source such as a web page, chat history, or an email, it is considered that the pasted table content is copied from text.

If the pasted table content is copied from text, step 717 is performed. If the pasted table content is not copied from text (for example, copied from another Excel table), this process is ended.

Step 717: The front-end program displays a selective panel of the paste option.

In an embodiment, the selective panel includes paste-related function options such as pasting the content only and keeping a format and pasting the content.

If the front-end program obtains a column-splitting result transmitted by the server, and an intelligent column-splitting option is added and displayed on the selective panel.

Step 718: The front-end program determines whether a user triggers a column-splitting option.

When the user triggers the column-splitting option, step 712 is performed. When the user does not trigger the column-splitting option, this process is ended.

Figure 21:
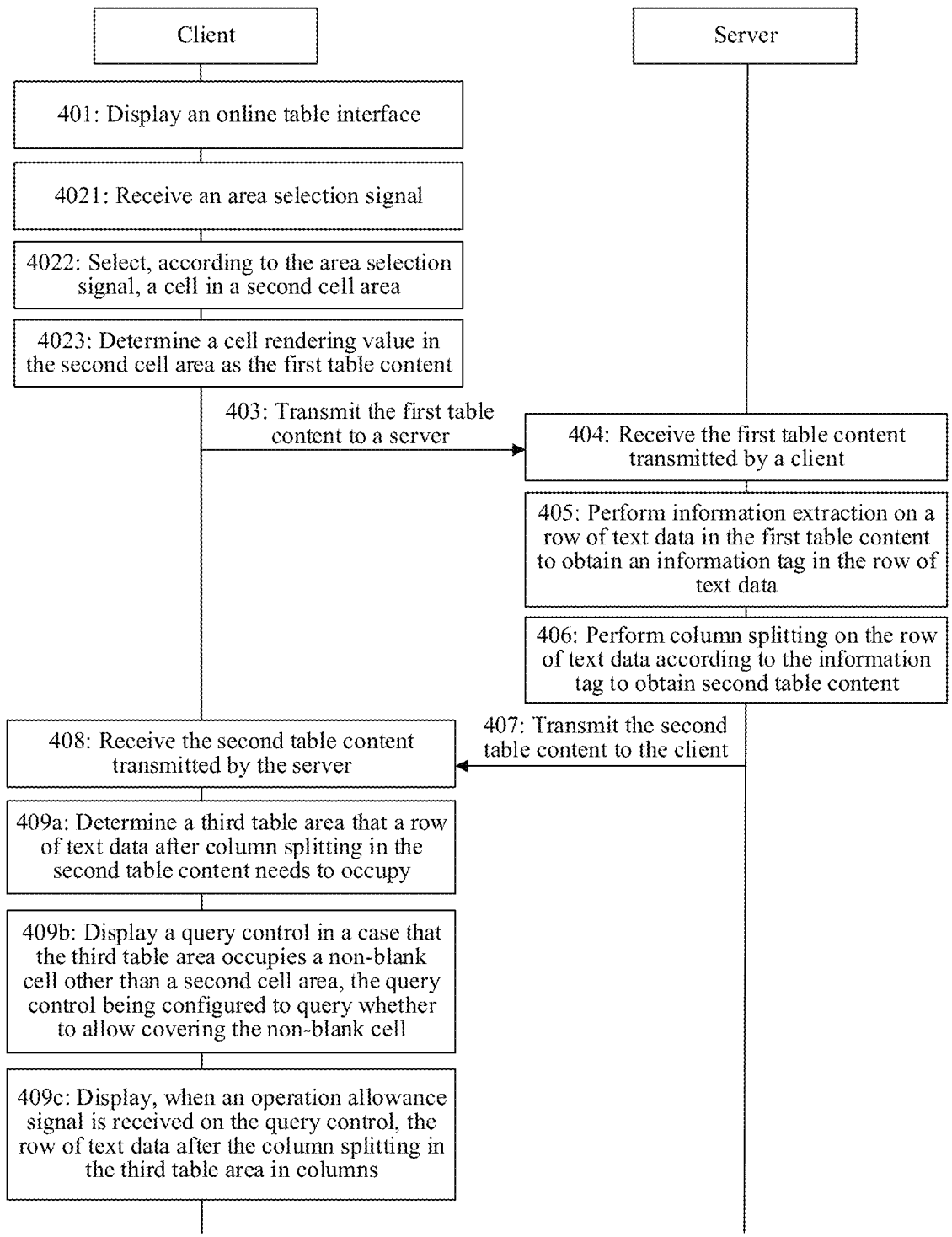
FIG. 21 is a flowchart of a method for automatically splitting table content into columns according to another exemplary embodiment of this application.

For the second column-splitting function triggering mode, refer to the following embodiment:

In another embodiment, the client determines first table content according to an area selection operation of a user, and step 402 can be alternatively implemented as sub-steps 4021 to 4023, as shown in FIG. 21:

Sub-step 4021: Receive an area selection signal.

Sub-step 4022: Select, according to the area selection signal, a cell in a second cell area.

Sub-step 4023: Determine a cell rendering value in the second cell area as the first table content.

The client determines a cell rendering value of the area of consecutive non-blank rows and columns in the second cell area as the first table content.

Figure 23:
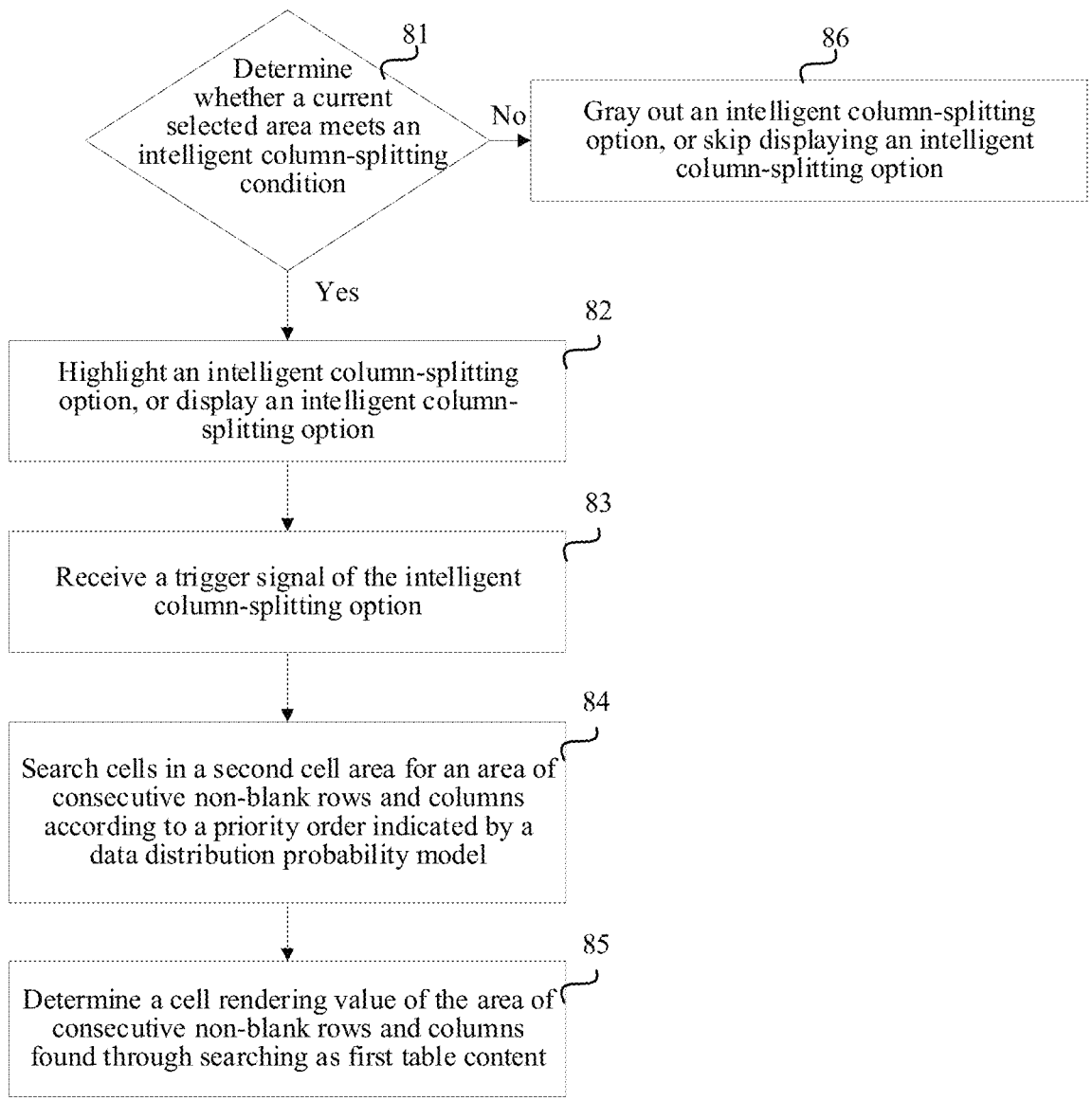
FIG. 23 is a flowchart of a method for automatically splitting table content into columns according to another exemplary embodiment of this application.

In an exemplary example shown in FIG. 23, sub-step 4023 includes the following steps:

Step 81: Determine whether a current selected area meets an intelligent column-splitting condition.

When the intelligent column-splitting condition is met, step 82 is performed. When the intelligent column-splitting condition is not met, step 83 is performed.

Step 82: Highlight an intelligent column-splitting option, or display an intelligent column-splitting option.

When the client is a PC client, the intelligent column-splitting option is highlighted.

When the client is a web client, the intelligent column-splitting option is displayed.

Step 83: Receive a trigger signal of the intelligent column-splitting option.

The trigger signal may be a signal of clicking the intelligent column-splitting option.

Step 84: Search cells in the second cell area for an area of consecutive non-blank rows and columns according to a priority order indicated by a data distribution probability model.

Since there may be a large number of cells in the second cell area selected by the user. For example, if the entire first column in the table is selected, there are many cells that are blank cells. The client may search cells in the second cell area for an area of consecutive non-blank rows and columns according to a priority order indicated by a data distribution probability model.

Figure 22:
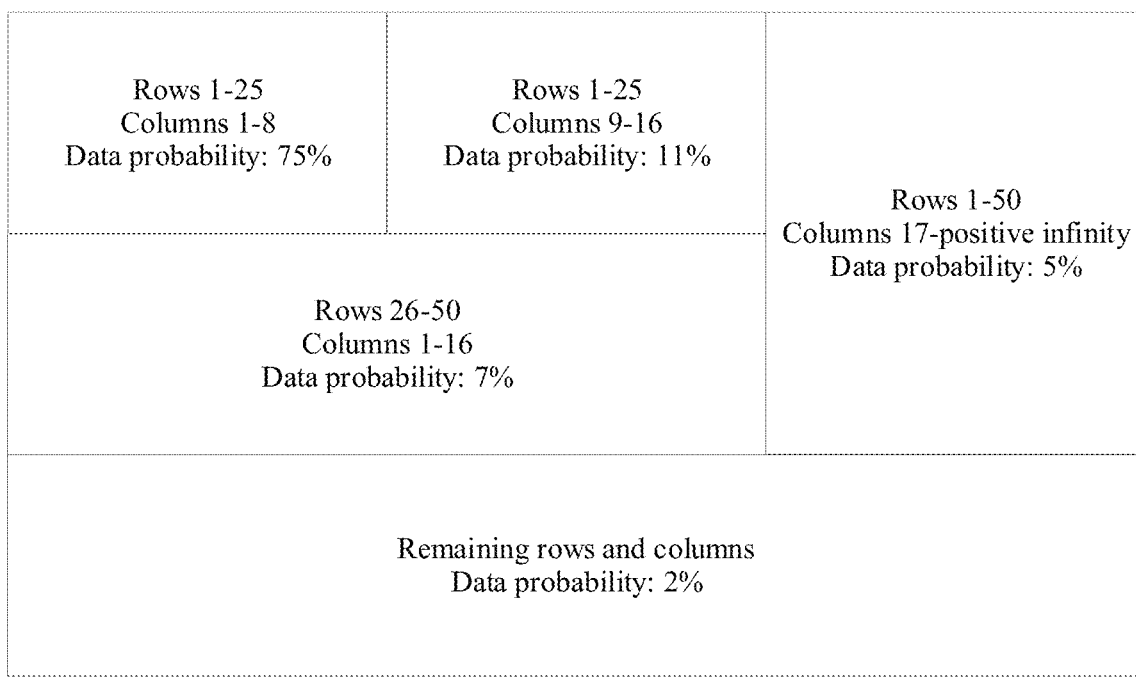
FIG. 22 is a flowchart of a method for automatically splitting table content into columns according to another exemplary embodiment of this application.

In an embodiment, the data distribution probability model is a probability model that collects, according to historical data, statistics to determine probabilities that table content appears at different distribution positions in the table area. Referring to an exemplary example shown in FIG. 22, a data probability that an area of consecutive non-blank rows and columns appears in rows 1-25 and columns 1-8 in the online table interface is 75%; a data probability that an area of consecutive non-blank rows and columns appears in rows 1-25 and columns 9-16 in the online table interface is 11%; a data probability that an area of consecutive non-blank rows and columns appears in rows 26-50 and columns 1-16 in the online table interface is 7%; a data probability that an area of consecutive non-blank rows and columns appears in rows 1-50 and columns 17-positive infinity in the online table interface is 5%; a data probability that an area of consecutive non-blank rows and columns appears in the remaining rows and columns in the online table interface is 2%.

Step 85: Determine a cell rendering value of the area of consecutive non-blank rows and columns found through searching as the first table content.

Step 86: Gray out an intelligent column-splitting option, or skip displaying an intelligent column-splitting option.

When the client is a PC client, the intelligent column-splitting option is grayed out.

When the client is a web client, the intelligent column-splitting option is not displayed.

Figure 24:
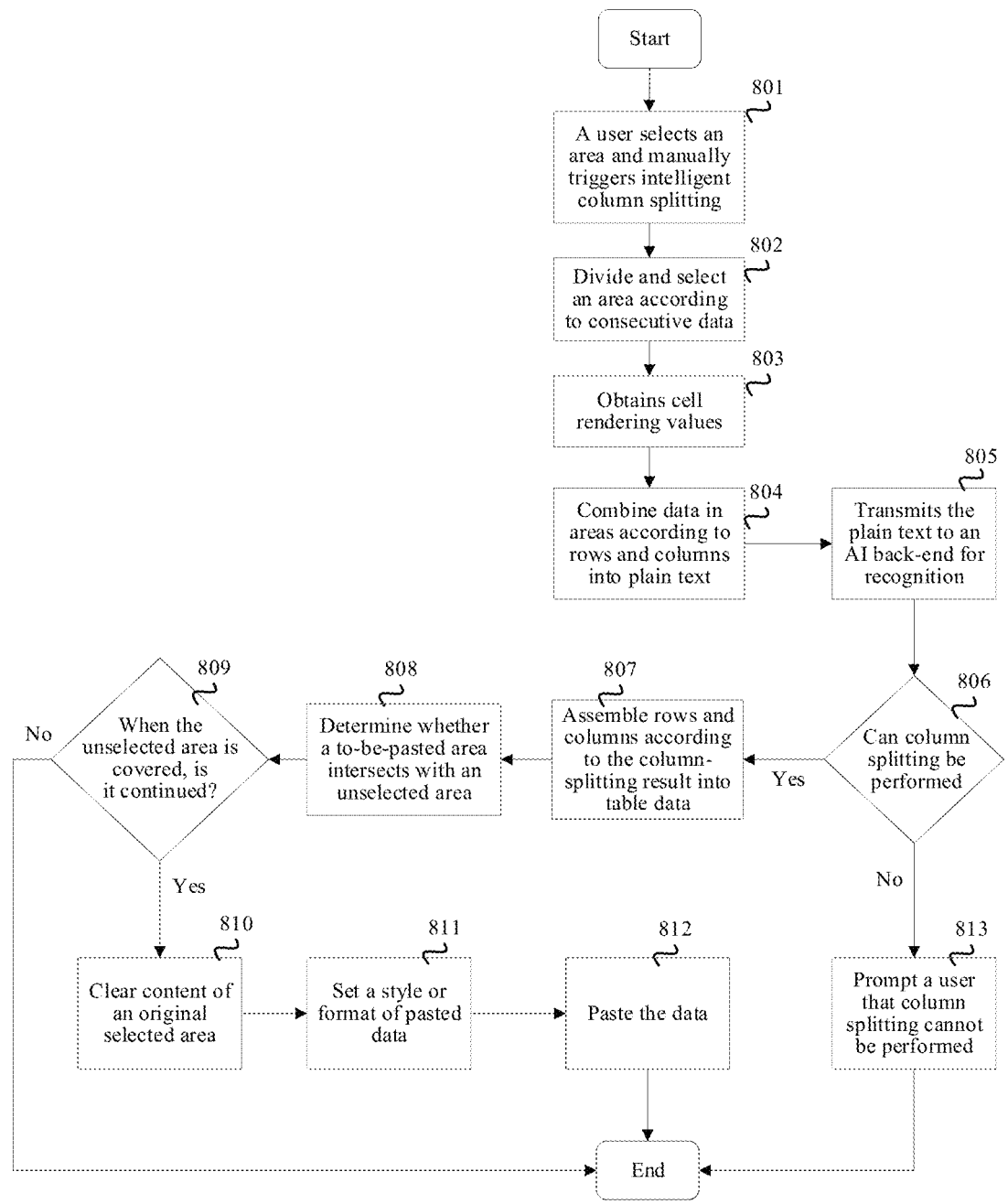
FIG. 24 is a flowchart of a method for automatically splitting table content into columns according to another exemplary embodiment of this application.

In an exemplary example, using the client being a web-based front-end program as an example, a process of triggering an automatic column-splitting function through an area selection operation is described. Exemplarily, as shown in FIG. 24, the method for automatically splitting table content into columns includes the following steps:

Step 801: A user selects an area and manually triggers intelligent column splitting.

Step 802: A front-end program divides and selects an area according to consecutive data.

The front-end program selects consecutive non-blank areas in the area according to a data distribution probability model.

Step 803: The front-end program obtains cell rendering values of the consecutive non-blank areas.

Step 804: The front-end program combines data in the areas according to rows and columns into plain text.

Exemplarily, after separating different rows by using a Tab character, the front-end program combines the rows into plain text.

Step 805: The front-end program transmits (first table content of) the plain text to an AI back-end for recognition.

Step 806: The AI back-end determines whether column splitting can be performed.

When column splitting can be performed, a column-splitting result is transmitted to the front-end program, step 807 is performed. When column splitting cannot be performed, step 813 is performed, to prompt the user that column splitting cannot be performed.

Step 807: The front-end program assembles rows and columns according to the column-splitting result into table data (second table content).

Step 808: The front-end program determines whether a to-be-pasted area intersects with an unselected area.

When the to-be-pasted area and the unselected area have the same cell, it is considered that the to-be-pasted area intersects with the unselected area.

If the to-be-pasted area intersects with the unselected area, step 809 is performed. If the to-be-pasted area does not intersect with the unselected area, step 810 is performed.

Step 809: When the unselected area is covered, the front-end program determines whether the user continues the operation.

In an embodiment, the front-end program pops up a query window to query the user whether to continue pasting the second table content.

When the user chooses to continue, step 810 is performed. When the user chooses not to continue, this process is ended.

Step 810: The front-end program clears content of an original selected area.

Step 811: The front-end program sets a style or format of pasted data.

Step 812: The front-end program pastes the data.

In conclusion, in the method provided in this embodiment, when a user performs an area selection operation in the online table interface, enabling of the intelligent column-splitting function is triggered, which is relatively suitable for a use scenario in which the user edits a table online, so that column-splitting efficiency during data aggregation can be improved.

In an embodiment, since the second table content after the column splitting occupies more table areas, step 409 can be alternatively implemented as sub-steps 409*a* to 409*c*, as shown in FIG. 18 or FIG. 21:

Sub-step 409*a*: Determine a third table area that a row of text data after column splitting in the second table content needs to occupy.

Sub-step 409*b*: Display a query control when the third table area occupies a non-blank cell other than the second cell area, the query control being configured to query whether to allow covering the non-blank cell.

Sub-step 409*c*: Display, when an operation allowance signal is received on the query control, the row of text data after the column splitting in the third table area in columns.

In conclusion, in the method provided in this embodiment, problems of losing useful data of a user caused by covering the useful data of the user after directly performing a paste operation and covering the third table area are reduced. The second table content can be copied to the third table area only when the user confirms that the covering is correct, to reduce unnecessary table data loss.

The following is an apparatus embodiment of the application. For details that are not specifically described in the apparatus embodiment, refer to the specific details in the foregoing method embodiment.

Figure 25:
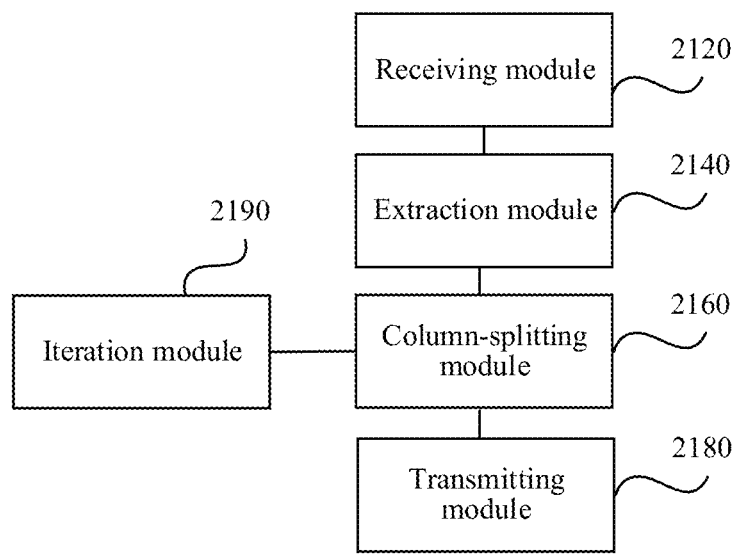
FIG. 25 is a block diagram of an apparatus for automatically splitting table content into columns according to another exemplary embodiment of this application.

FIG. 25 is a block diagram of an apparatus for automatically splitting table content into columns according to an exemplary embodiment of this application. The apparatus may be implemented as all or a part of the server by using software, hardware, or a combination thereof. The apparatus includes: a receiving module 2120, an extraction module 2140, a column-splitting module 2160, and a transmitting module 2180.

The receiving module 2120 is configured to receive first table content sent by a client, the first table content including a row of text data to be split into columns.

The extraction module 2140 is configured to perform information extraction on the row of text data in the first table content to obtain an information tag in the row of text data.

The column-splitting module 2160 is configured to perform column splitting on the row of text data according to the information tag to obtain second table content, where the second table content including a row of text data after the column splitting.

The transmitting module 2180 is configured to transmit the second table content to the client.

In an embodiment, the extraction module 214 is configured to extract a plurality of rows of text data from the first table content; input, for any row of text data in the plurality of rows of text data, the row of text data into a plurality of information extraction models to obtain entity information extracted by the information extraction models; and label the entity information extracted from the row of text data with an information tag associated with a corresponding information extraction model.

The information extraction model is one of the plurality of information extraction models.

In an embodiment, the information extraction models include: a first information extraction model, configured to perform information extraction by using a machine learning feature.

The extraction module 2140 is configured to input the row of text data into the first information extraction model, and predict a first character string of which a text feature matches the machine learning feature; and determine the first character string as the extracted entity information when the first character string of which a text feature matches the machine learning feature is predicted.

In an embodiment, the information extraction models include: a second information extraction model, configured to perform information extraction by using an enumeration vocabulary.

The extraction module 2140 is configured to input the row of text data to the second information extraction model to determine whether there is a second character string matching the enumeration vocabulary; and determine, when there is a second character string matching the enumeration vocabulary, the second character string as the extracted entity information.

In an embodiment, the information extraction models include: a third information extraction model, configured to perform information extraction by using a regular expression.

The extraction module 2140 is configured to input the row of text data into the third information extraction model to determine whether there is a third character string matching the regular expression; and determine, when there is a third character string matching the regular expression, the third character string as the extracted entity information.

In an embodiment, the first table content is text data stored in a text form.

The extraction module 2140 is configured to recognize an initial column-splitting position and an end column-splitting position of the text data; and perform row-splitting processing on a text data segment located between the initial column-splitting position and the end column-splitting position by using row-splitting rules sequentially according to a priority order, and obtaining the plurality of rows of text data when the row-splitting processing succeeds, the row-splitting rule including at least one of a serial number row-splitting rule, a space row-splitting rule, and a separator row-splitting rule.

The extraction module 2140 is configured to recognize a segment head feature in the text data, the segment head feature including at least one of a semantic keyword, a serial number keyword, and a separator;

recognize a previous position or a next position of a position at which the segment head feature is located as the initial column-splitting position; and recognize the last position of the text data as the end column-splitting position.

In an embodiment, the column-splitting module 2160 is configured to align pieces of entity information having the same information tag in the rows of text data into the same column, and align pieces of entity information having different information tags into different columns, to obtain the second table content.

In an embodiment, the column-splitting module 2160 is configured to obtain an entity information pair from n rows of text data, the entity information pair including the entity information and an information tag corresponding to the entity information, and n being a positive integer;

add an entity information pair in the ith row of text data to the ith stack as a stack element, the row of text data corresponding to the stack in a one-to-one manner, and i being a positive integer not greater than n.

collect statistics to determine a first reference information tag that appears most frequently in stack head elements of the stacks and a second reference information tag that appears most frequently in secondary stack head elements;

shift, when an information tag of a stack head element in the jth stack is different from the first reference information tag, but is the same as the second reference information tag, a stack element in the jth stack toward a direction of a stack end by one position, and fill a stack head element of the jth stack with a blank stack element, j being a positive integer not greater than n;

shift, when an information tag of a stack head element in the jth stack is different from the first reference information tag and is different from the second reference information tag, a stack element in the jth stack toward a direction of a stack head by one position, and set the first stack element after the shifting as an added stack head element, the added stack element being an element located above the stack head element; and shift, when information tags of stack head elements in the n stacks are all the first reference information tags, the stack head elements in the n stacks out to the same blank column having the smallest serial number in a target table.

In an embodiment, the apparatus further includes an iteration module 2190, configured to collect, according to information tag counts of the information tags in the rows of text data, statistics to determine a normal value of the information tag count;

perform, when there is a first row of text data of which the information tag count is greater than the normal value, and the information tag count of an adjacent row of the first row of text data equals the normal value, row re-splitting on the first row of text data; and perform, when there is a second row of text data of which the information tag count is less than the normal value, and the information tag count of a third row of text data adjacent to the second row of text data is greater than the normal value, row re-splitting on the second row of text data and the third row of text data.

In an embodiment, the apparatus further includes an iteration module 2190, configured to collect, according to information tag counts of the information tags in the rows of text data, statistics to determine a normal value of the information tag count; and determine, when there is a last row of text data of which the information tag count is greater than the normal value, and the information tag count of a previous row of the last row of text data equals the normal value, an interfering character string in the last row of text data; and remove the interfering character string from the last row of text data.

Figure 26:
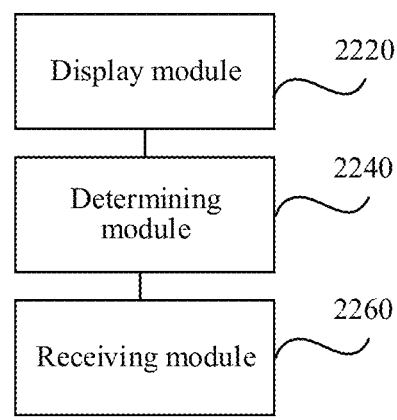
FIG. 26 is a block diagram of an apparatus for automatically splitting table content into columns according to another exemplary embodiment of this application.

FIG. 26 is a block diagram of an apparatus for automatically splitting table content into columns according to an exemplary embodiment of this application. The apparatus may be implemented as all or a part of the terminal by using software, hardware, or a combination thereof. The apparatus includes: a display module 2220, a determining module 2240, and a receiving module 2260.

The display module 2220 is configured to display an online table interface.

The determining module 2240 is configured to determine first table content in the online table interface according to an operation signal, and transmit the first table content to a server.

The receiving module 2260 is configured to receive second table content transmitted by the server, the second table content being obtained by performing, by the server, column splitting on the row of text data in the first table content according to an information tag, the information tag being obtained by performing, by the server, information extraction on a row of text data in the first table content.

The display module 2220 is configured to display the second table content in the online table interface, the second table content including a row of text data after the column splitting.

In an embodiment, the determining module 2240 is configured to receive a paste signal; paste, according to the paste signal, table content to a cell in a first cell area of the online table interface; and determine the pasted table content as the first table content.

In an embodiment, the determining module 2240 is configured to receive an area selection signal; select, according to the area selection signal, a cell in a second cell area of the online table interface; and determine a cell rendering value in the second cell area as the first table content.

In an embodiment, the determining module 2240 is configured to search cells in the second cell area for an area of consecutive non-blank rows and columns according to a priority order indicated by a data distribution probability model; collect, according to historical data, statistics to determine probabilities that table content appears at different distribution positions in the table area, and search cells of the second cell area for an area of consecutive non-blank rows and columns; and determine a cell rendering value of the area of consecutive non-blank rows and columns found through searching as the first table content.

In an embodiment, the display module 2220 is configured to determine a third table area that a row of text data after column splitting in the second table content needs to occupy;

display a query control when the third table area occupies a non-blank cell other than the second cell area, the query control being configured to query whether to allow covering the non-blank cell; and display, when an operation allowance signal is received on the query control, the row of text data after the column splitting in the third table area in columns.

In this application, the term "module" typically refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules or units. Moreover, a module can be part of another overall module that includes the functionalities of the module.

Figure 27:
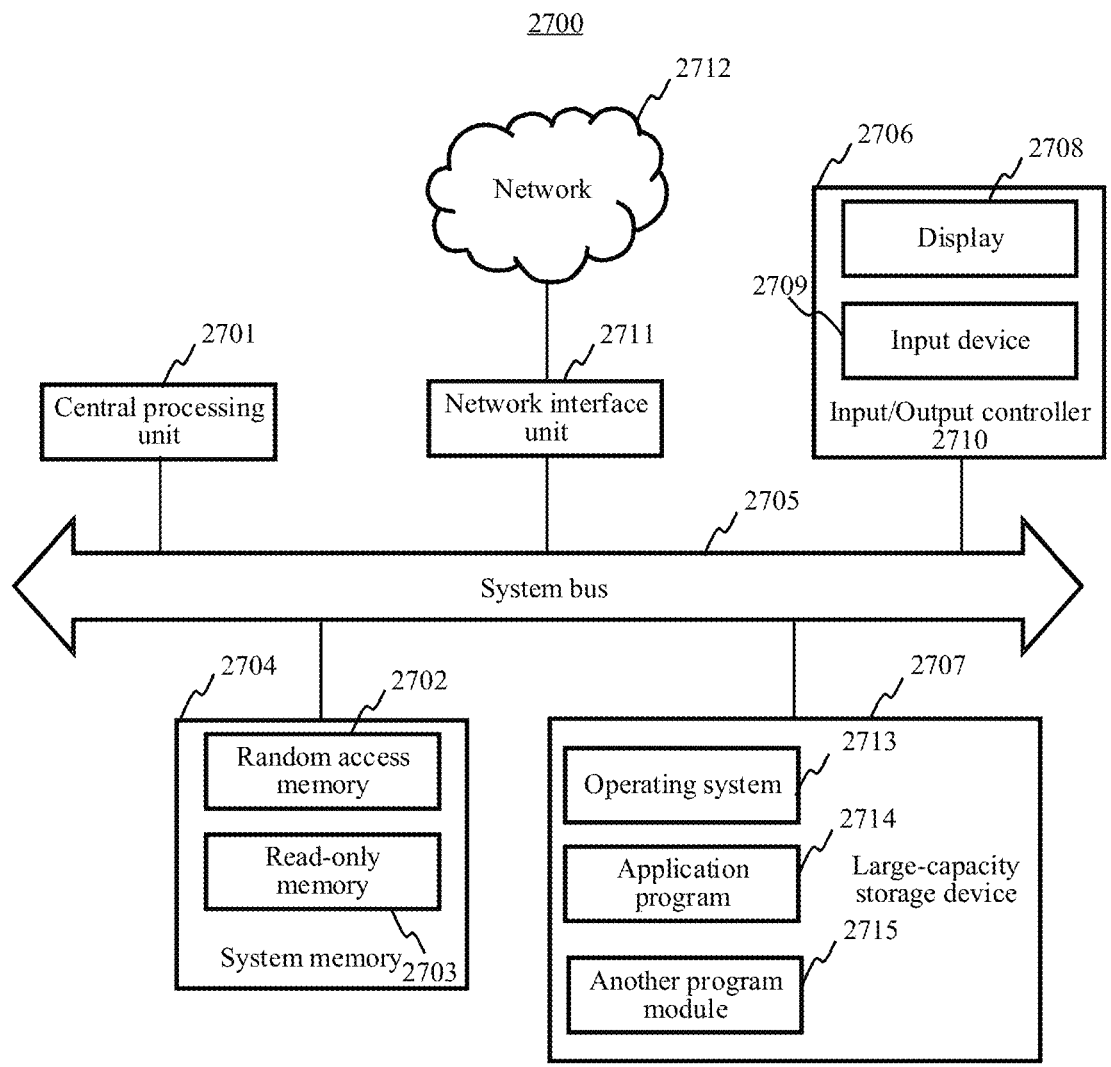
FIG. 27 is a block diagram of a computer device specifically implemented as a server according to an exemplary embodiment of this application.

FIG. 27 is a schematic structural diagram of a server according to an embodiment of the present invention. The server is configured to perform the method for automatically splitting table content into columns according to the foregoing embodiment. Specifically:

The server 2700 includes a central processing unit (CPU) 2701, a system memory 2704 including a random access memory (RAM) 2702 and a read-only memory (ROM)

2703, and a system bus 2705 connecting the system memory 2704 and the CPU 2701. The server 2700 further includes a basic input/output system (I/O system) 2706 for transmitting information between components in a computer, and a large-capacity storage device 2707 configured to store an operating system 2713, an application program 2714, and another program module 2715.

The basic I/O system 2706 includes a display 2708 configured to display information and an input device 2709 such as a mouse or a keyboard that is used for inputting information by a user. The display 2708 and the input device 2709 are both connected to the CPU 2701 by using an input/output controller 2710 connected to the system bus 2705. The basic I/O system 2706 may further include the input/output controller 2710, to receive and process inputs from a plurality of other devices, such as the keyboard, the mouse, or an electronic stylus. Similarly, the input/output controller 2710 further provides an output to a display screen, a printer, or another type of output device.

The mass storage device 2707 is connected to the CPU 2701 by using a mass storage controller (not shown) connected to the system bus 2705. The large-capacity storage device 2707 and an associated computer-readable medium provide non-volatile storage for the server 2700. That is, the mass storage device 2707 may include a computer readable medium (not shown), such as a hard disk or a CD-ROM drive.

Without loss of generality, the computer readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an EPROM, an EEPROM, a flash memory, or another solid-state storage technology, a CD-ROM, a DVD, or another optical storage, a magnetic cassette, a magnetic tape, a magnetic disk storage, or another magnetic storage device. Certainly, it may be known by a person skilled in the art that the computer storage medium is not limited to the foregoing several types. The system memory 2704 and the mass storage device 2707 may be collectively referred to as a memory.

According to various embodiments of this application, the server 2700 may further be connected, by using a network such as the Internet, to a remote computer on the network and run. That is, the server 2700 may be connected to a network 2712 by using a network interface unit 2711 connected to the system bus 2705, or may be connected to another type of network or remote computer system (not shown) by using the network interface unit 2711.

The memory further includes one or more programs. The one or more programs are stored in the memory and configured to be executed by one or more processors. The one or more programs include a computer program used for performing the foregoing method for automatically splitting table content into columns.

Figure 28:
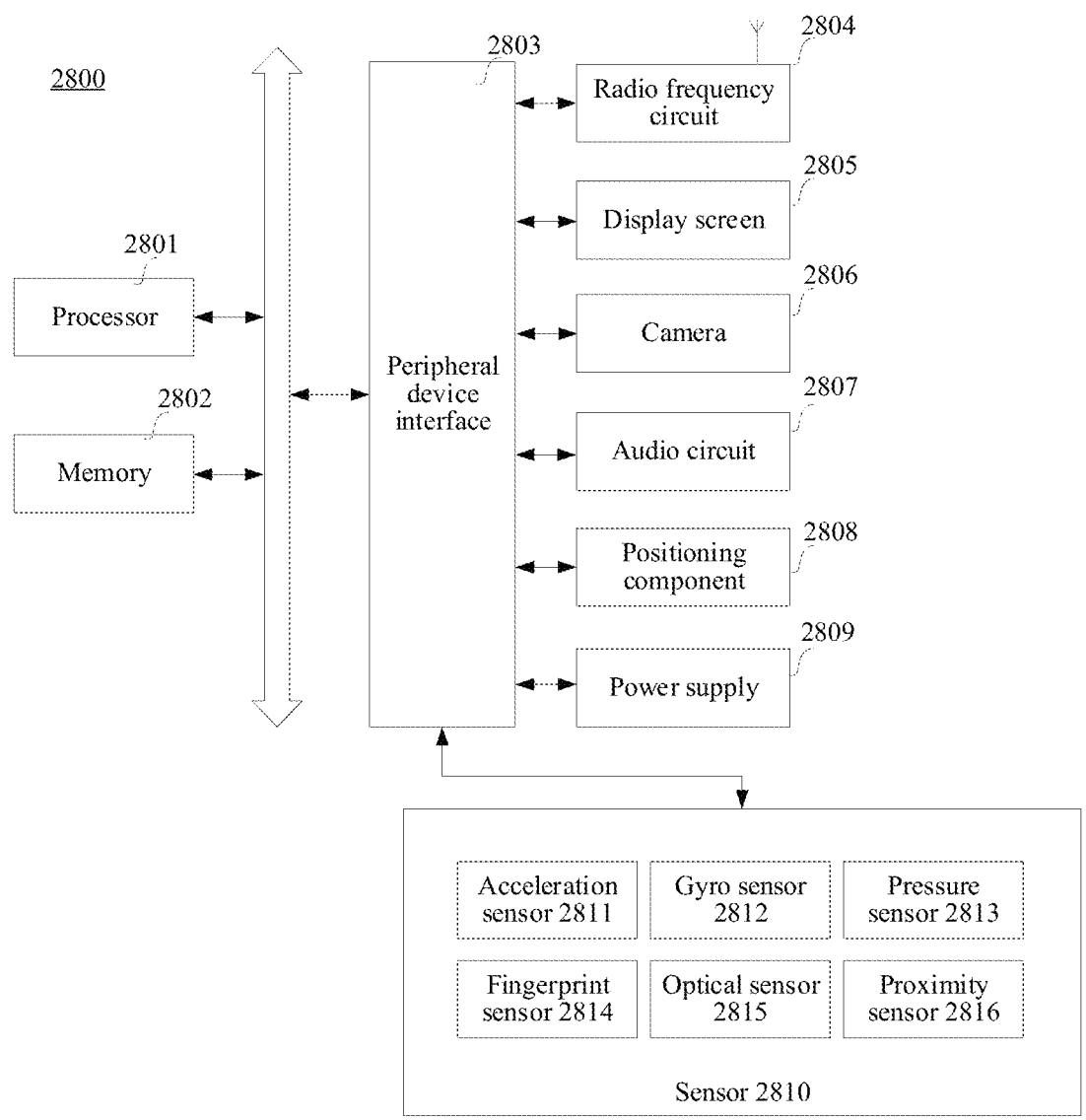
FIG. 28 is a block diagram of a computer device specifically implemented as a terminal according to an exemplary embodiment of this application.

FIG. 28 shows a structural block diagram of a terminal 2800 according to an exemplary embodiment of the disclosure. The terminal 2800 may be a smartphone, a tablet computer, an MP3 player, an MP4 player, a notebook computer, or a desktop computer. The terminal 2800 may also be referred to as another name such as a user device, a portable terminal, a laptop terminal, or a desktop terminal.

Generally, the terminal 2800 includes a processor 2801 and a memory 2802.

The processor 2801 may include one or more processing cores, and may be, for example, a 4-core processor or an 8-core processor. The processor 2801 may be implemented in at least one hardware form of a digital signal processor (DSP), a field-programmable gate array (FPGA), and a programmable logic array (PLA). The processor 2801 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 2801 may be integrated with a graphics processing unit (GPU). The GPU is configured to be responsible for rendering and drawing content that a display needs to display. In some embodiments, the processor 2801 may further include an artificial intelligence (AI) processor. The AI processor is configured to process a calculation operation related to machine learning.

The memory 2802 may include one or more computer-readable storage media. The computer-readable storage medium tangible may be non-transient. The memory 2802 may further include a high-speed random access memory and a non-volatile memory, for example, one or more disk storage devices or flash memory devices. In some embodiments, the non-transitory computer-readable storage medium in the memory 2802 is configured to store at least one instruction, and the at least one instruction being configured to be executed by the processor 2801 to implement the method for automatically splitting table content into columns provided in the method embodiments of this application.

In some embodiments, the terminal 2800 may alternatively include: a peripheral device interface 2803 and at least one peripheral device. The processor 2801, the memory 2802, and the peripheral device interface 2803 may be connected by a bus or a signal line. Each peripheral device may be connected to the peripheral device interface 2803 by using a bus, a signal cable, or a circuit board. Specifically, the peripheral device includes at least one of a radio frequency circuit 2804, a display screen 2805, a camera 2806, an audio circuit 2807, a positioning component 2808, and a power supply 2809.

The peripheral device interface 2803 may be configured to connect the at least one peripheral device related to input/output (I/O) to the processor 2801 and the memory 2802. In some embodiments, the processor 2801, the memory 2802, and the peripheral device interface 2803 are integrated on a same chip or circuit board. In some other embodiments, any one or two of the processor 2801, the memory 2802, and the peripheral device interface 2803 may be implemented on a separate chip or the circuit board. This is not limited in this embodiment.

The radio frequency circuit 2804 is configured to receive and transmit a radio frequency (RF) signal, also referred to as an electromagnetic signal. The RF circuit 2804 communicates with a communication network and another communication device by using the electromagnetic signal. The RF circuit 2804 converts an electric signal into an electromagnetic signal for transmission, or converts a received electromagnetic signal into an electric signal. In an embodiment, the RF circuit 2804 includes: an antenna system, an RF transceiver, one or more amplifiers, a tuner, an oscillator, a digital signal processor, a codec chip set, a subscriber identity module card, memory, and the like. The RF circuit 2804 may communicate with other terminals through at least one wireless communication protocol. The wireless communication protocol includes, but is not limited to a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 2804 may further include a circuit related to a near field communication (NFC) related circuit. This is not limited in this application.

The display screen 2805 is configured to display a user interface (UI). The UI may include a graphic, a text, an icon, a video, and any combination thereof. When the display screen 2805 is a touchscreen, the display screen 2805 is further capable of collecting a touch signal on or above a surface of the display screen 2805. The touch signal may be inputted into the processor 2801 as a control signal for processing. In this case, the display screen 2805 may be further configured to provide a virtual button and/or a virtual keyboard, also referred to as a soft button and/or a soft keyboard. In some embodiments, there may be one display screen 2805, disposed on a front panel of the terminal 2800. In some other embodiments, there may be two display screens 2805, respectively disposed on different surfaces of the terminal 2800 or designed in a foldable shape. In still some other embodiments, the display screen 2805 may be a flexible display screen, disposed on a curved surface or a folded surface of the terminal 2800. Even, the display screen 2805 may be further set to have a non-rectangular irregular graph, that is, a special-shaped screen. The display screen 2805 may be manufactured by using a material such as a liquid crystal display (LCD), an organic light-emitting diode (OLED), or the like.

The camera component 2806 is configured to collect an image or a video. In an embodiment, the camera assembly 2806 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, each being any one of a main camera, a depth of field camera, a wide-angle camera, and a telephoto camera, to implement a background blurring function through fusion of the main camera and the depth of field camera, panoramic photo shooting and virtual reality (VR) shooting functions through fusion of the main camera and wide-angle camera, or another fusion shooting function. In some embodiments, the camera assembly 2806 may further include a flash. The flash may be a single color temperature flash or a double color temperature flash. The double color temperature flash refers to a combination of a warm flash and a cold flash, and may be configured to perform light ray compensation at different color temperatures.

The audio circuit 2807 may include a microphone and a speaker. The microphone is configured to collect sound waves of a user and an environment, and convert the sound waves into electrical signals and input the electrical signals into the processor 2801 for processing, or input the electrical signals into the RF circuit 2804 to implement speech communication. For the purpose of stereo collection or noise reduction, there may be a plurality of microphones, disposed at different portions of the terminal 2800 respectively. The microphone may be further an array microphone or an omni-directional collection type microphone. The speaker is configured to convert electrical signals from the processor 2801 or the RF circuit 2804 into sound waves. The speaker may be a conventional thin-film speaker or a piezoelectric ceramic speaker. When the speaker is the piezoelectric ceramic speaker, electrical signals not only can be converted into sound waves that can be heard by human, but also can be converted into sound waves that cannot be heard by human for ranging and the like. In some embodiments, the audio circuit 2807 may further include an earphone jack.

The positioning component 2808 is configured to position a current geographic location of the terminal 2800 for implementing navigation or a location based service (LBS). The positioning component 2808 may be a positioning component based on the global positioning system (GPS) of the United States, the BeiDou system of China, and the GALILEO system of the European Union.

The power supply 2809 is configured to supply power to components in the terminal 2800. The power supply 2809 may be an alternating current, a direct current, a disposable battery, or a rechargeable battery. When the power supply 2809 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the terminal 2800 may also include one or more sensors 2810. The one or more sensors 2810 include, but are not limited to: an acceleration sensor 2811, a gyro sensor 2812, a pressure sensor 2813, a fingerprint sensor 2814, an optical sensor 2815, and a proximity sensor 2816.

The acceleration sensor 2811 may detect the magnitude of acceleration on three coordinate axes of a coordinate system established with the terminal 2800. For example, the acceleration sensor 2811 may be configured to detect a component of gravity acceleration on the three coordinate axes. The processor 2801 may control, according to a gravity acceleration signal collected by the acceleration sensor 2811, the display screen 2805 to display the user interface in a frame view or a portrait view. The acceleration sensor 2811 may be further configured to collect motion data of a game or a user.

The gyroscope sensor 2812 may detect a body direction and a rotation angle of the terminal 2800. The gyroscope sensor 2812 may cooperate with the acceleration sensor 2811 to collect a 3D action by the user on the terminal 2800. The processor 2801 may implement the following functions according to the data collected by the gyro sensor 2812: motion sensing (such as changing the UI according to a tilt operation of the user), image stabilization at shooting, game control, and inertial navigation.

The pressure sensor 2813 may be disposed at a side frame of the terminal 2800 and/or a lower layer of the touch display 2805. When the pressure sensor 2813 is disposed on the side frame of the terminal 2800, a holding signal of the user on the terminal 2800 may be detected. The processor 2801 performs left and right hand recognition or a quick operation according to the holding signal collected by the pressure sensor 2813. When the pressure sensor 2813 is disposed on the low layer of the display screen 2805, the processor 2801 controls, according to a pressure operation of the user on the display screen 2805, an operable control on the UI. The operable control includes at least one of a button control, a scroll-bar control, an icon control and a menu control.

The fingerprint sensor 2814 is configured to collect a fingerprint of the user. The processor 2801 recognizes an identity of the user according to the fingerprint collected by the fingerprint sensor 2814, or the fingerprint sensor 2814 recognizes an identity of the user according to the collected fingerprint. When recognizing that the user's identity is a trusted identity, the processor 2801 authorizes the user to perform related sensitive operations. The sensitive operations include: unlocking a screen, viewing encryption information, downloading software, paying and changing a setting, and the like. The fingerprint sensor 2814 may be disposed on a front surface, a back surface, or a side surface of the terminal 2800. When a physical button or a vendor logo is disposed on the terminal 2800, the fingerprint 2814 may be integrated with the physical button or the vendor logo.

The optical sensor 2815 is configured to collect ambient light intensity. In an embodiment, the processor 2801 may control display luminance of the touch display screen 2805 according to the ambient light intensity collected by the optical sensor 2815. Specifically, when the ambient light intensity is relatively high, the display luminance of the display screen 2805 is increased. when the ambient light intensity is relatively low, the display luminance of the display screen 2805 is reduced. In another embodiment, the processor 2801 may further dynamically adjust a camera parameter of the camera component 2806 according to the ambient light intensity collected by the optical sensor 2815.

The proximity sensor 2816, also referred to as a distance sensor, is generally disposed on the front panel of the terminal 2800. The proximity sensor 2816 is configured to collect a distance between the user and the front surface of the terminal 2800. In an embodiment, when the proximity sensor 2816 detects that the distance between the user and the front surface of the terminal 2800 gradually becomes smaller, the touch display screen 2805 is controlled by the processor 2801 to switch from a screen-on state to a screen-off state. When the proximity sensor 2816 detects that the distance between the user and the front surface of the terminal 2800 gradually becomes larger, the touch display screen 2805 is controlled by the processor 2801 to switch from the screen-off state to the screen-on state.

A person skilled in the art may understand that a structure shown in FIG. 28 constitutes no limitation on the terminal 2800, and the terminal may include more or fewer components than those shown in the figure, or some components may be combined, or a different component deployment may be used.

According to another aspect of this application, a non-volatile computer-readable storage medium, storing computer-readable instructions, the computer-readable instructions, when executed by one or more processors, causing the one or more processors to perform operations in the method for automatically splitting table content into columns.

According to another aspect of this application, a computer program product is provided, the computer program product, when run on a computer, causing the computer to perform the method for automatically splitting table content into columns according to the foregoing aspects.

A person of ordinary skill in the art may understand that all or some of the steps of the embodiments may be implemented by hardware, or may be implemented by a program instructing related hardware. The program may be stored in a computer-readable storage medium. The storage medium mentioned above may include: a read-only memory, a magnetic disk, or an optical disc.

The foregoing descriptions are merely preferred embodiments of this application, and are not intended to limit this application. Any modification, equivalent replacement, improvement and the like made within the spirit and principle of this application shall fall within the protection scope of this application.

What is claimed is:

1. A method for automatically splitting table content into columns, performed by a server, the method comprising:
    receiving first table content sent by a client, the first table content comprising one or more rows of text data to be split into columns;
    performing information extraction on the one or more rows of text data in the first table content to obtain information tags in the one or more rows of text data, further including:
        extracting a plurality of rows of text data from the first table content;
        inputting, for any row of text data in the plurality of rows of text data, the row of text data into a plurality of information extraction models to obtain entity information extracted by the information extraction models; and
        labeling the entity information extracted from the row of text data with an information tag associated with a corresponding information extraction model;
    performing column splitting on the one or more rows of text data according to the information tags to obtain second table content, the second table content comprising one or more columns of text data after the column splitting; and
    transmitting the second table content to the client.

2. The method according to claim 1, wherein the information extraction models comprise: a first information extraction model, configured to perform information extraction by using a machine learning feature; and
    the inputting the row of text data into a plurality of information extraction models to obtain entity information extracted by the information extraction models comprises:
    inputting the row of text data into the first information extraction model, and predicting a first character string of which a text feature matches the machine learning feature; and
    determining the first character string as the extracted entity information when the first character string of which a text feature matches the machine learning feature is predicted.

3. The method according to claim 1, wherein the information extraction models comprise: a second information extraction model, configured to perform information extraction by using an enumeration vocabulary; and
    the inputting the row of text data into a plurality of information extraction models to obtain entity information extracted by the information extraction models comprises:
    inputting the row of text data into the second information extraction model to determine whether there is a second character string matching the enumeration vocabulary; and
    determining, when there is a second character string matching the enumeration vocabulary, the second character string as the extracted entity information.

4. The method according to claim 1, wherein the information extraction models comprise: a third information extraction model, configured to perform information extraction by using a regular expression; and
    the inputting the row of text data into a plurality of information extraction models to obtain entity information extracted by the information extraction models comprises:

inputting the row of text data into the third information extraction model to determine whether there is a third character string matching the regular expression; and determining, when there is a third character string matching the regular expression, the third character string as the extracted entity information.

5. The method according to claim 1, wherein the first table content comprises text data stored in a text form; and the extracting a plurality of rows of text data from the first table content comprises:

recognizing an initial column-splitting position and an end column-splitting position of the text data; and performing row-splitting processing on a text data segment located between the initial column-splitting position and the end column-splitting position by using row-splitting rules sequentially according to a priority order, and obtaining the plurality of rows of text data when the row-splitting processing succeeds, the row-splitting rule comprising at least one of a serial number row-splitting rule, a space row-splitting rule, and a separator row-splitting rule.

6. The method according to claim 5, wherein the recognizing an initial column-splitting position and an end column-splitting position of the text data comprises:

recognizing a segment head feature in the text data, the segment head feature comprising at least one of a semantic keyword, a serial number keyword, and a separator;

recognizing a previous position or a next position of a position at which the segment head feature is located as the initial column-splitting position; and recognizing the last position of the text data as the end column-splitting position.

7. The method according to claim 1, wherein the performing column splitting on the row of text data according to the information tags to obtain second table content comprises:

aligning pieces of entity information having the same information tag in the rows of text data into the same column, and aligning pieces of entity information having different information tags into different columns, to obtain the second table content.

8. The method according to claim 7, wherein the aligning pieces of entity information having the same information tag in the rows of text data into the same column, and aligning pieces of entity information having different information tags into different columns, to obtain the second table content comprises:

obtaining an entity information pair from n rows of text data, the entity information pair comprising the entity information and an information tag corresponding to the entity information, and n being a positive integer;

adding the entity information pair in the $i^{th}$ row of text data to the $i^{th}$ stack, the row of text data corresponding to the stack in a one-to-one manner, and arranging the entity information pairs as stack elements in the stack from a stack head to a stack end according to an appearance order of corresponding pieces of entity information in the row of text data, i being a positive integer not greater than n;

collecting statistics to determine a first reference information tag that appears most frequently in stack head elements of the stacks and a second reference information tag that appears most frequently in secondary stack head elements;

shifting, when an information tag of a stack head element in the $j^{th}$ stack is different from the first reference information tag, but is the same as the second reference information tag, a stack element in the $j^{th}$ stack toward a direction of a stack end by one position, and filling a stack head element of the $j^{th}$ stack with a blank stack element, j being a positive integer not greater than n;

shifting, when an information tag of a stack head element in the $j^{th}$ stack is different from the first reference information tag and is different from the second reference information tag, a stack element in the $j^{th}$ stack toward a direction of a stack head by one position, and setting the first stack element after the shifting as an added stack head element, the added stack element being an element located above the stack head element; and shifting, when information tags of stack head elements in the n stacks are all the first reference information tags, the stack head elements in the n stacks out to the same blank column, to obtain the second table content.

9. The method according to claim 1, further comprising:

collecting, according to information tag counts of the information tags in the one or more rows of text data, statistics to determine a normal value of the information tag count;

performing, when there is a first row of text data of which the information tag count is greater than the normal value, and the information tag count of an adjacent row of the first row of text data equals the normal value, row re-splitting on the first row of text data;

performing, when there is a second row of text data of which the information tag count is less than the normal value, and the information tag count of a third row of text data adjacent to the second row of text data is greater than the normal value, row re-splitting on the second row of text data and the third row of text data; and performing column splitting on the one or more rows of text data after the row re-splitting.

10. The method according to claim 1, further comprising:

collecting, according to information tag counts of the information tags in the one or more rows of text data, statistics to determine a normal value of the information tag count;

determining, when there is a last row of text data of which the information tag count is greater than the normal value, and the information tag count of a previous row of the last row of text data equals the normal value, an interfering character string in the last row of text data;

removing the interfering character string from the last row of text data; and performing column splitting on the row of text data having the interfering character string removed.

11. A computer device comprising a processor and a memory, the memory storing computer-readable instructions, the computer-readable instructions, when executed by the processor, causing the processor to perform a plurality of operations including:

receiving first table content sent by a client, the first table content comprising one or more rows of text data to be split into columns;

performing information extraction on the one or more rows of text data in the first table content to obtain information tags in the one or more rows of text data, further including:

extracting a plurality of rows of text data from the first table content;

inputting, for any row of text data in the plurality of rows of text data, the row of text data into a plurality of information extraction models to obtain entity information extracted by the information extraction models; and labeling the entity information extracted from the row of text data with an information tag associated with a corresponding information extraction model;

performing column splitting on the one or more rows of text data according to the information tags to obtain second table content, the second table content comprising one or more columns of text data after the column splitting; and transmitting the second table content to the client.

12. The computer device according to claim 11, wherein the performing column splitting on the row of text data according to the information tags to obtain second table content comprises:

aligning pieces of entity information having the same information tag in the rows of text data into the same column, and aligning pieces of entity information having different information tags into different columns, to obtain the second table content.

13. The computer device according to claim 11, wherein the plurality of operations further comprise:

collecting, according to information tag counts of the information tags in the one or more rows of text data, statistics to determine a normal value of the information tag count;

performing, when there is a first row of text data of which the information tag count is greater than the normal value, and the information tag count of an adjacent row of the first row of text data equals the normal value, row re-splitting on the first row of text data;

performing, when there is a second row of text data of which the information tag count is less than the normal value, and the information tag count of a third row of text data adjacent to the second row of text data is greater than the normal value, row re-splitting on the second row of text data and the third row of text data; and performing column splitting on the one or more rows of text data after the row re-splitting.

14. The computer device according to claim 11, wherein the plurality of operations further comprise:

collecting, according to information tag counts of the information tags in the one or more rows of text data, statistics to determine a normal value of the information tag count;

determining, when there is a last row of text data of which the information tag count is greater than the normal value, and the information tag count of a previous row of the last row of text data equals the normal value, an interfering character string in the last row of text data;

removing the interfering character string from the last row of text data; and performing column splitting on the row of text data having the interfering character string removed.

15. A non-transitory computer-readable storage medium, storing computer-readable instructions that, when executed by one or more processors, causing the one or more processors to perform a plurality of operations including:

receiving first table content sent by a client, the first table content comprising one or more rows of text data to be split into columns;

performing information extraction on the one or more rows of text data in the first table content to obtain information tags in the one or more rows of text data, further including:

extracting a plurality of rows of text data from the first table content;

inputting, for any row of text data in the plurality of rows of text data, the row of text data into a plurality of information extraction models to obtain entity information extracted by the information extraction models; and labeling the entity information extracted from the row of text data with an information tag associated with a corresponding information extraction model;

performing column splitting on the one or more rows of text data according to the information tags to obtain second table content, the second table content comprising one or more columns of text data after the column splitting; and transmitting the second table content to the client.

16. The non-transitory computer-readable storage medium according to claim 15, wherein the performing column splitting on the row of text data according to the information tags to obtain second table content comprises:

aligning pieces of entity information having the same information tag in the rows of text data into the same column, and aligning pieces of entity information having different information tags into different columns, to obtain the second table content.

17. The non-transitory computer-readable storage medium according to claim 15, wherein the plurality of operations further comprise:

collecting, according to information tag counts of the information tags in the one or more rows of text data, statistics to determine a normal value of the information tag count;

performing, when there is a first row of text data of which the information tag count is greater than the normal value, and the information tag count of an adjacent row of the first row of text data equals the normal value, row re-splitting on the first row of text data;

performing, when there is a second row of text data of which the information tag count is less than the normal value, and the information tag count of a third row of text data adjacent to the second row of text data is greater than the normal value, row re-splitting on the second row of text data and the third row of text data; and performing column splitting on the one or more rows of text data after the row re-splitting.

18. The non-transitory computer-readable storage medium according to claim 15, wherein the plurality of operations further comprise:

collecting, according to information tag counts of the information tags in the one or more rows of text data, statistics to determine a normal value of the information tag count;

determining, when there is a last row of text data of which the information tag count is greater than the normal value, and the information tag count of a previous row of the last row of text data equals the normal value, an interfering character string in the last row of text data;

removing the interfering character string from the last row of text data; and performing column splitting on the row of text data having the interfering character string removed.

* * * * *